United States Patent
Rehlaender et al.

(10) Patent No.: US 12,451,812 B2
(45) Date of Patent: Oct. 21, 2025

(54) ISOLATED FULL-BRIDGE CONVERTER

(71) Applicant: Delta Electronics (Thailand) Public Co., Ltd., Samutprakarn (TH)

(72) Inventors: Philipp Rehlaender, Paderborn (DE); Frank Schafmeister, Warburg (DE); Joachim Böcker, Berlin (DE); Linna Lv, JiangSu Province (CN)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 257 days.

(21) Appl. No.: 18/312,601

(22) Filed: May 5, 2023

(65) Prior Publication Data
US 2023/0412086 A1 Dec. 21, 2023

(30) Foreign Application Priority Data

May 5, 2022 (EP) ................................. 22171911

(51) Int. Cl.
*H02M 3/335* (2006.01)
*H02M 1/00* (2006.01)
*H02M 7/5387* (2007.01)

(52) U.S. Cl.
CPC ..... *H02M 3/33573* (2021.05); *H02M 1/0058* (2021.05); *H02M 7/53871* (2013.01)

(58) Field of Classification Search
CPC ........... H02M 3/33573; H02M 1/0058; H02M 7/53871
See application file for complete search history.

(56) References Cited

U.S. PATENT DOCUMENTS

| | | |
|---|---|---|
| 5,864,471 A | 1/1999 | Kammiller et al. |
| 6,469,919 B1 | 10/2002 | Bennett |
| 9,178,438 B2 * | 11/2015 | Fu ..................... H02M 3/33576 |
| 10,135,350 B2 * | 11/2018 | Ye ..................... H02M 3/33576 |
| 2013/0223104 A1 | 8/2013 | Tian et al. |
| 2015/0078036 A1 | 3/2015 | Jovanovic et al. |
| 2017/0033701 A1 * | 2/2017 | Fu ..................... H02M 3/33576 |
| 2020/0112260 A1 | 4/2020 | Suzuki et al. |
| 2023/0077388 A1 * | 3/2023 | Rehlaender ............. H02M 3/01 363/17 |

FOREIGN PATENT DOCUMENTS

WO     WO-2020023471 A1 *  1/2020  .............. H02J 3/381

OTHER PUBLICATIONS

Philipp Rehlaender et al., "Frequency-Doubler Modulation for Reduced Junction Temperatures for LLC Resonant Converters Operated in Half-Bridge Configuration", pp. 1-10, Published in: 2021 23rd European Conference on Power Electronics and Applications (EPE'21 ECCE Europe), IEEE, Oct. 25, 2021.

Kinbo Ruan et al., "An improved ZVS PWM full-bridge converter with clamping diodes", pp. 1476-1481, Published in: 2004 IEEE 35th Annual Power Electronics Specialists Conference (IEEE Cat. No.04CH37551), IEEE, Jun. 20, 2004.

The related extended European search report issued on Dec. 5, 2022.

* cited by examiner

*Primary Examiner* — Adolf D Berhane
(74) *Attorney, Agent, or Firm* — CKC & Partners Co., LLC

(57) ABSTRACT

The disclosure concerns a full-bridge converter (1) that is capable to provide different operation and transition modes that lead to reduced losses and stressing of the components of the full-bridge converter (1). This is achieved by a clamping circuit and applying specific switching patterns to the transistors (S1, S2, S3, S4) of a full bridge of the full-bridge converter (1).

18 Claims, 7 Drawing Sheets

ISOLATED FULL-BRIDGE CONVERTER

CROSS-REFERENCE TO RELATED APPLICATION

This application claims priority to European Patent Application No. 22171911.5, filed on May 5, 2022, which is hereby incorporated by reference in its entirety.

TECHNICAL FIELD

The disclosure is referring to an isolated full-bridge converter and to a method for driving an isolated full-bridge converter.

BACKGROUND

Isolated full-bridge converter can be operated in a number of modulations. In particular, Isolated full-bridge converters might be operated in a full-bridge mode to provide a full-bridge modulation or might be operated in a half-bridge mode to provide a half-bridge modulation.

A converter that is typically operated in full-bridge mode can be operated in half-bridge mode to increase the operating range. In half-bridge mode, one MOSFET is continuously turned while the other leg is pulsed. This modulation reduces the secondary side semiconductor blocking voltage making this mode particularly attractive for large input voltages. A disadvantage of this modulation, however, is that it results in unbalanced MOSFET losses—one switch is stressed with the full primary transformer RMS current while the two pulsing switches are stressed with only half the conduction losses but with additional switching losses.

While ZVS may not be achieved in full-bridge mode, the conventionally large switching losses can be largely reduced by employing GaN and SiC MOSFETs. Therefore, this modulation is becoming increasingly more popular as the switching losses are limited. While the converter is typically operated in full-bridge mode, it can also be operated in half-bridge mode to increase the operating range. In this operation mode, one MOSFET is continuously turned while the other leg is pulsed.

To operate an isolated full-bridge converter at high input voltages, the operation can be switched from the conventional full-bridge operation to the half-bridge mode. To switch from one operation mode to the other, the on-the-fly morphing modulation is employed. However, conventional morphing modulations for switching between different operation modes, in particular in between full-bridge operation and half-bridge mode, can lead to critically high blocking voltages of the rectifier semiconductors and an increased transformer flux.

SUMMARY

It is an object of the disclosure to provide transformer clamping method along with a modified modulation. Through the proposed modulation, the transformer can be build up with a smaller cross section and with the clamping technique rectifiers of a smaller blocking voltage can be selected.

It is a further object of the disclosure to provide a modulation mode that is capable to improve a loss distribution.

The object is achieved by an isolated full-bridge converter and a method for driving an isolated full-bridge converter according to the independent claims.

An isolated full-bridge converter according to the disclosure is configured to selectively operate in one of at least two different operation modes, wherein the isolated full-bridge converter comprises a primary side, comprising an inverter that comprises a full bridge on a primary side of the isolated full-bridge converter which comprises a first leg of the full bridge, the first leg comprising a first transistor and a third transistor, and a second leg of the full bridge, the second leg comprising a second transistor and a fourth transistor, wherein the first transistor and the second transistor are connected to a first input port of the isolated full-bridge converter and the third transistor and the fourth transistor are connected to a second input port of the isolated full-bridge converter, a secondary side, comprising a rectifier, a transformer comprising a primary winding that is coupled to the primary side and a secondary winding that is coupled to the secondary side.

The method according to the disclosure is for driving an isolated full-bridge converter that comprises a primary side, comprising an inverter that comprises a full bridge on a primary side of the isolated full-bridge converter which comprises a first leg of the full bridge, the first leg comprising a first transistor and a third transistor, and a second leg of the full bridge, the second leg comprising a second transistor and a fourth transistor, wherein the first transistor and the second transistor are connected to a first input port of the isolated full-bridge converter and the third transistor and the fourth transistor are connected to a second input port of the isolated full-bridge converter, a secondary side, comprising a rectifier, a transformer, comprising a primary winding that is coupled to the primary side and a secondary winding that is coupled to the secondary side. The method comprises selectively driving the isolated full-bridge converter in one of at least two different operation modes.

The isolated full-bridge converter is a converter that comprises a primary side and a secondary side and is configured to convert a DC-input voltage that is provided to a primary side to a different DC output voltage that is output on the secondary side of the isolated full-bridge converter. The isolated full-bridge converter typically comprises a DC/AC-Converter on the primary side and an AC/DC-converter or a rectifier on the secondary side. The primary side and the secondary side of the isolated full-bridge converter are coupled by means of a transformer. In an implementation, the transformer is coupled to an output of the DC/AC-Converter via a resonance circuit.

The isolated full-bridge converter comprises the first leg and the second leg. In an implementation, a layout of the first leg and the second leg is identical and two transistors are connected in series in each leg. Each leg of the full bridge of the isolated full-bridge converter is connected between two input ports of the isolated full-bridge converter. In particular, the first and the second transistor are directly connected to a first input port of the isolated full-bridge converter and the third and the fourth transistor are directly connected to a second input port of the isolated full-bridge converter. A first output port of the full bridge is provided in between the first and the second transistor. A second output port of the full bridge is provided in between the third and the fourth transistor. The first and the second transistor are both one of high-side and low-side transistors of the full bridge and the third and the fourth transistor are both the other one of the high-side and the low-side transistors of the full bridge.

The first to fourth transistors are in particular MOSFETs.

The isolated full-bridge converter is configured to selectively operate in one of at least two different operation modes. That is, the isolated full-bridge converter is capable to switch between the at least two different operation modes. In an implementation, a control logic is configured to drive the isolated full-bridge converter to operate in one of the at least two different operation modes. The different operation modes are modes that are defined by having different switching patterns for the transistors of the full bridge. In an implementation, one of the different operation modes is a full bridge operation.

In an implementation, the isolated full-bridge converter is configured to operate in a first operation mode in which a switching cycle of a duration of 2T is repeated to generate a number of subsequent switching cycles, wherein the switching cycle comprises a first interval, a second interval, a third interval and a fourth interval, which are subsequent intervals in the given order, wherein the time duration of each one of the intervals is equal to a duration of T/2, the first transistor is switched on once per switching cycle to be in a conducting state and is switched off once per switching cycle to be in a non-conducting state, wherein the first transistor is switched on during the first interval and is switched off during the third interval of each switching cycle, the third transistor is switched on once per switching cycle to be in a conducting state and is switched off once per switching cycle to be in a non-conducting state, wherein the third transistor is switched on during the fourth interval and is switched off during the fourth interval of each switching cycle, the second transistor is switched on once per switching cycle to be in a conducting state and is switched off once per switching cycle to be in a non-conducting state, wherein the second transistor is switched on during the second interval and is switched off during the second interval of each switching cycle, the fourth transistor is switched on once per switching cycle to be in a conducting state and is switched off once per switching cycle to be in a non-conducting state, wherein the fourth transistor is switched on during the third interval of each switching cycle and is switched off during the first interval of a following switching cycle, wherein the first transistor and the fourth transistor are pulsed with a duty cycle having a first duration of $(2+D)*T/2$, and wherein the third transistor and second transistor are pulsed with a duty cycle having a second duration of $DT/2$, wherein D is a variable parameter.

In other words, the isolated full-bridge converter is configured to operate in a first operation mode, wherein the first transistor is switched on once per switching cycle to be continuously in a conducting state in the first interval, the second interval and the third interval of each switching cycle, and is switched off once per switching cycle to be in a non-conducting state in the fourth interval of the subsequent switching cycles, the third transistor is switched on once per switching cycle to be continuously in a conducting state in the fourth interval of each switching cycle, and is switched off once per switching cycle to be in a non-conducting state in the first interval, the second interval and the third interval of the subsequent switching cycles, the second transistor is switched on once per switching cycle to be continuously in a conducting state in the second interval of each switching cycle, and is switched off once per switching cycle to be in a non-conducting state in the first interval, the third interval and the fourth interval of the subsequent switching cycles, and the fourth transistor is in a conducting state in the first interval, the third interval and the fourth interval of each switching cycle, wherein the fourth transistor is switched on once per switching cycle to be continuously in a conducting state in the third interval and the fourth interval of each switching cycle and in the first interval of a following switching cycle, and is switched off once per switching cycle to be in a non-conducting state in the second interval of the subsequent switching cycles.

With the first operation mode, the isolated full-bridge converter is capable to provide an improved loss distribution. That is, the loss that is caused by the resistance of the transistors is evenly distributed over the first to fourth transistor. Consequently, it is avoided that one of the transistors is heating up above average and is either limiting the capabilities of the entire circuit or is suffering from aging effects.

In the first operation mode a switching cycle of a duration of 2T is repeated to generate a number of subsequent switching cycles. A switching cycle is a time interval that is defined in that specific switching operations are performed within this time interval. A starting point of one switching cycle is equivalent to an ending point of a previous switching cycle. The duration of the switching cycle can be changeable during operation. A switching cycle comprises four intervals, in particular exactly four intervals, wherein the four intervals have the same length of T/2, which sums up to a duration of 2T per switching cycle. The parameter T defines a time unit. As the switching cycle has a duration of 2T, in an implementation, each time interval has a duration that is equal to a quarter of the switching cycle. The switching cycle defines a time unit, which allows to define the temporary relations of the different operations that are performed by the isolated full-bridge converter.

It is noted that the isolated full-bridge converter might also be capable to work in a configuration mode that has a switching cycle with a duration T that comprises exactly two intervals with the duration T/2. In this case, the switching cycle with the duration T is to be understood as half a switching cycle of the duration of 2T.

The switching cycle comprises a first interval, a second interval, a third interval and a fourth interval, which are subsequent intervals in the given order. That is, each switching cycle starts with a first interval. The first interval is followed by the second interval. The second interval is followed by the third interval. The third interval is followed by the fourth interval. The end of the fourth interval is the end of the respective switching cycle.

The first operation mode is defined by a specific sequence for switching the first to fourth transistor. Each of the transistors can be switched to a conducting state, also referred to as on or enabled, and can be switched to a non-conducting state, also referred to as off or disabled.

The first transistor is switched on once per switching cycle to be continuously in a conducting state in the first interval, the second interval and the third interval of each switching cycle. That is, the first transistor maintains in the conducting state after being switched on in the first interval until it is switched off in the third interval. The first transistor is not necessarily in the conducting state over the entire first to third time intervals. In particular, the first transistor is switched on after a switching interval in the first interval and is switched off a switching interval before the third interval ends. The switching interval is added to avoid a status in which both of the first and the third transistor are simultaneously in a conducting state, which would lead to a short circuit. Also, the switching intervals defines the duty cycle of the first transistors and therefore define the output voltage of the isolated full-bridge converter. The first transistor is switched off once per switching cycle to be in a non-conducting state in the fourth interval of the subsequent switching cycles. In an implementation, the first transistor is in the non-conducting state over the entire fourth time interval. There are exactly two switching operations for the first transistor in each switching cycle, which are provided by once switching the first transistor on and by once switching the first transistor off.

The third transistor is switched on once per switching cycle to be continuously in a conducting state in the fourth interval of each switching cycle. That is, the third transistor maintains in the conducting state after being switched on in the fourth interval until it is switched off in the fourth interval. The third transistor is not necessarily in the conducting state over the entire fourth time interval. In particular, the third transistor is switched on after a switching interval in the fourth interval and is switched off a switching interval before the fourth interval ends. The switching interval is added to avoid a status in which both of the first and the third transistor are simultaneously in a conducting state, which would lead to a short circuit. Also, the switching intervals defines the duty cycle of the third transistor and therefore define the output voltage of the isolated full-bridge converter. The third transistor is switched off once per switching cycle to be in a non-conducting state in the first to third interval of the subsequent switching cycles. As the fourth interval is at the end of each switching cycle, this implies that the third transistor is switched off in the fourth interval to be in a non-conducting state for the first to third interval of a following switching cycle. In an implementation, the third transistor is in the non-conducting state over the entire first to third time intervals. There are exactly two switching operations for the third transistor in each switching cycle, which are provided by once switching the third transistor on and by once switching the third transistor off.

The second transistor is switched on once per switching cycle to be continuously in a conducting state in the second interval of each switching cycle, and is switched off once per switching cycle to be in a non-conducting state in the first interval, the third interval and the fourth interval of the subsequent switching cycles. That is, the second transistor maintains in the conducting state after being switched on in the second interval until it is switched off in the second interval. The second transistor is not necessarily in the conducting state over the entire second time interval. In particular, the second transistor is switched on after a switching interval in the second interval and is switched off a switching interval before the second interval ends. The switching interval is added to avoid a status in which both of the second and the fourth transistor are simultaneously in a conducting state, which would lead to a short circuit. Also, the switching interval defines the duty cycle of the second transistor and therefore defines the output voltage of the isolated full-bridge converter. The second transistor is switched off once per switching cycle to be in a non-conducting state in the first, third and fourth interval of the subsequent switching cycles. As the second interval is in between the first and fourth interval in each switching cycle, this implies that the second transistor is switched off in the third interval of one switching cycle to be in a non-conducting state for the third interval and the fourth interval of one switching cycle and for the first interval of a following switching cycle. In an implementation, the second transistor is in the non-conducting state over the entire third, fourth and first time interval. There are exactly two switching operations for the second transistor in each switching cycle, which are provided by once switching the second transistor on and by once switching the second transistor off.

The fourth transistor is switched on once per switching cycle to be continuously in a conducting state in the third, the fourth interval and the first interval of each switching cycle, and is switched off once per switching cycle to be in a non-conducting state in the second interval of the subsequent switching cycles. That is, the fourth transistor maintains in the conducting state after being switched on in the third interval until it is switched off in the first interval. The fourth transistor is not necessarily in the conducting state over the entire third, fourth and first time interval. As the fourth interval is at the end of each switching cycle, this implies that the fourth transistor is switched on in the third interval of one switching cycle to be in the conducting state for the third interval and the fourth interval of one switching cycle and for the first interval of a following switching cycle. In particular, the fourth transistor is switched on after a switching interval in the third interval and is switched off a switching interval before the first interval ends. The switching interval is added to avoid a status in which both of the second and the fourth transistor are simultaneously in a conducting state, which would lead to a short circuit. Also, the switching interval defines the duty cycle of the fourth transistor and therefore defines the output voltage or current of the isolated full-bridge converter. The fourth transistor is switched off once per switching cycle to be in a non-conducting state in the second interval of the subsequent switching cycles. In an implementation, the fourth transistor is in the non-conducting state over the entire second time interval. There are exactly two switching operations for the fourth transistor in each switching cycle, which are provided by once switching the fourth transistor on and by once switching the fourth transistor off.

Thus, the first and the third transistor are switching in an alternating way and the second and the fourth transistor are switching in an alternating way. However, the duty cycles of the first and the third transistor are different. Also, the duty cycles of the second and the fourth transistor are different. Four different time intervals are generated in which there are subsequent overlap times in which the first and the fourth transistor, the first and the second transistor, the first and the fourth transistor and the third and the fourth transistor are switched on simultaneously. Each of the overlap times defines one switching state. Consequently, the isolated full-bridge converter is capable to provide four different switching states by using a number of switching operations that would lead only to two different switching states in a conventional full bridge operation. Therefore the first operation mode is also referred to as Frequency-Doubler Half-Bridge Modulation. As the different states have essentially the same duration and the different states all are applied once per switching cycle, each of the transistors is stressed with the same conduction losses, which leads to an improved loss distribution. Experimental measurement results prove the concept showing that a maximum MOSFET temperature was reduced by as much as 11 K from 107° C. to 96° C.

In an implementation, the time durations of the intervals sum up to the duration of the switching cycle. That is, there are no optional further switching actions in any further intervals.

The first transistor and the fourth transistor are pulsed with a duty cycle having a first duration of $(2+D)*T/2$, and the third transistor and second transistor are pulsed with a duty cycle having a second duration of $DT/2$, wherein D is a variable parameter. In an implementation, the parameter D is a value in the range between 0 and 1. The parameter D defines the time at which a transistor is switched on and off in the respective time interval of the switching cycle. Higher values for D lead to longer times in which the transistors are in the conducting state, which leads to higher output voltages or currents. Accordingly, lower values for D lead to shorter times in which the transistors are in the conducting state, which leads to lower output voltages or currents. In an implementation, the isolated full-bridge converter is configured to modify the value of the parameter D to control an output voltage of the isolated full-bridge converter in the first operation mode. Thus, the duration of the switching cycle can be maintained unchanged, while an output voltage of the isolated full-bridge converter can be changed.

In an implementation, the duty cycles of the first transistor and the fourth transistor are shifted by a duration of T with respect to each other, and the duty cycles of the third transistor and the second transistor are shifted by a duration of T with respect to each other. Thus, it can be assured that a uniform output signal is provided by the isolated full-bridge converter.

In an implementation, the isolated full-bridge converter is configured to generate a triangular signal having a duty cycle of a duration of 2T, wherein each one of the transistors is switched to the conducting state when a corresponding threshold is exceeded by the triangular signal and is switched off when the corresponding threshold is underrun by the triangular signal. In an implementation, the duty cycle of the triangular signal is synchronized with the switching cycle. Using the triangular signal, the switching of the transistors can be controlled by four comparators. In particular, a first comparator can be used to control a operation of the first transistor, a second comparator can be used to control a operation of the second transistor, a third comparator can be used to control a operation of the third transistor and a fourth comparator can be used to control a operation of the fourth transistor. Different threshold values are assigned to the comparators that lead to the switching of the comparators according to the first operation mode. In an implementation, the triangular signal is maintained when switching to a different operation mode, for example to a first operation mode, wherein the threshold values that are assigned to the comparators are adapted for switching the transistors according to the different operation mode. Thus, a simple mechanism for controlling the switching operations of the transistors can be provided.

In an implementation, the isolated full-bridge converter comprises a blocking capacitor that is connected to an output port of the first leg or an output port of the second leg. A blocking capacitor is a capacitor that has a larger capacity than a capacitor that is used to adapt a resonance of a resonance circuit that is connected to the primary side of the transformer to the duration of the switching cycles in a full bridge operation. This allows that a current can be buffered in the blocking capacitor when there is no direct path to a ground potential for an output current that is provided by the full bridge.

In an implementation, the first transistor and the second transistor are connected to a first input port of the isolated full-bridge converter and the third transistor and the fourth transistor are connected to a second input port of the isolated full-bridge converter. In an implementation, the connection is a direct connection, that is, there are no further components in between these transistors and the respective input port.

In an implementation, the isolated full-bridge converter is further configured to operate in a second operation mode to provide a full bridge operation. A full bridge operation is a modulation in which the first and the fourth transistor are switched on and off simultaneously and the second and the third transistor are switched on and off simultaneously. Thus, the full-bridge converter can be used to provide a maximum output power. The full bridge operation is a Phase-shift modulation which is employed to achieve zero-voltage switching (ZVS) for the primary switches, that is for the transistors.

In an implementation, the switching cycle of the duration of 2T is repeated to generate a number of subsequent second switching cycles in the second operation mode, wherein the switching cycle comprises the first interval, the second interval, the third interval and the fourth interval, which are subsequent intervals in the given order, wherein the time duration of each one of the intervals is equal to the duration of T/2, the first transistor is switched on twice per switching cycle to be in a conducting state and is switched off twice per switching cycle to be in a non-conducting state, wherein the first transistor is once switched on and then switched off during the first interval and is once switched on and then switched off during the third interval, the third transistor is switched on twice per switching cycle to be in a conducting state and is switched off twice per switching cycle to be in a non-conducting state, wherein the third transistor is once switched on and then switched off during the second interval and is once switched on and then switched off during the fourth interval, the second transistor is switched on twice per switching cycle to be in a conducting state and is switched off twice per switching cycle to be in a non-conducting state, wherein the second transistor is once switched on and then switched off during the second interval and is once switched on and then switched off during the fourth interval, and the fourth transistor is switched on twice per switching cycle to be in a conducting state and is switched off twice per switching cycle to be in a non-conducting state, wherein the fourth transistor is once switched on and then switched off during the first interval and is once switched on and then switched off during the third interval, wherein the first transistor, the second transistor, the third transistor and the fourth transistor are all controlled to be pulsed with a duty cycle having a third duration of DT/2, wherein D is a variable parameter. In other words, the first transistor is switched on twice per switching cycle to be in a conducting state in the first interval and the third interval of each switching cycle, and is switched off twice per switching cycle to be in a non-conducting state in the second interval and the fourth interval of the subsequent switching cycles, the third transistor is switched on twice per switching cycle to be in a conducting state in the second interval and the fourth interval of each switching cycle, and is switched off twice per switching cycle to be in a non-conducting state in the first interval and the third interval of the subsequent switching cycles, and the second transistor is switched on twice per switching cycle to be in a conducting state in the second interval and the fourth interval of each switching cycle, and is switched off twice per switching cycle to be in a non-conducting state in the first interval, the third interval of the subsequent switching cycles, and the fourth transistor is switched on twice per switching cycle to be in a conducting state in the first interval and the third interval of each switching cycle, and is switched off twice per switching cycle to be in a non-conducting state in the second interval and the fourth interval of the subsequent switching cycles.

That is, the switching cycles of the transistors in the second operation mode are aligned to the switching cycles in the first operation mode. It is noted that one switching interval of the second operation mode might be read as half a switching cycle of the first operation mode, as same operations are repeated in the switching intervals during the second operation mode. The first to fourth transistor are not necessarily switched on during the entire interval.

In an implementation, the isolated full-bridge converter is further configured to operate in a first transition mode, which is applied when switching between the first operation mode and the second operation mode, wherein the switching cycle of the duration of 2T is repeated to generate a number of subsequent second switching cycles, wherein the switching durations of the first to fourth transistor in the first transition mode are morphed from the switching durations of the second operation mode to the switching durations of the first operation mode over multiple second switching cycles when switching from the second operation mode to the first operation mode, or morphed from the switching durations of the first operation mode to the switching durations of the second operation mode over multiple second switching cycles when switching from the first operation mode to the second operation mode. That is, there is no immediate change between the switching operations of different operation modes, as this would lead to undesired current spikes in an output voltage.

In an implementation, the switching cycle in the first transition mode comprises the first interval, the second interval, the third interval and the fourth interval, which are subsequent intervals in the given order, wherein the time duration of each one of the intervals is equal to the duration of T/2, wherein when switching from the second operation mode to the first operation mode, the time interval for which the first transistor is switched to be in the conducting state in the first interval in the second operation mode is increasing over subsequent switching cycles in the first transition mode by switching the first transistor to the non-conducting state at a later point of time in each switching cycle, the time interval for which the first transistor is switched to be in the conducting state in the third interval in the second operation mode is increasing over subsequent switching cycles in the first transition mode by switching the first transistor to the conducting state at an earlier point of time in each switching cycle, and the time interval for which the third transistor is switched to be in the conducting state in the second interval in the second operation mode is decreasing over subsequent switching cycles in the first transition mode. In other words, the time that the first transistor is switched to be in the conducting state is constantly increasing while the time that the third transistor is switched to be in the conducting state is decreasing. Starting with the phases in which the first transistor in the conducting state in the first and in the third interval in the second operation mode, the two phases in which the first transistor is switched to be in the conducting state are increasing and when these phases join to be one constant time interval in which the first transistor is continuously in the conducting state, the change from the second operation mode to the first operation mode has completed. In an implementation, when switching from the first operation mode to the second operation mode in the first transition mode, the time interval for which the first transistor is switched to be in the conducting state in the first interval, the second interval and the third interval in the first operation mode is split into two time intervals by switching the first transistor to the non-conducting state and switching the first transistor to the conducting state in the second interval, wherein the time between these two time intervals is increasing over subsequent switching cycles in the first transition mode, and the third transistor is switched to the conducting state between the two time intervals, wherein the time that the third transistor is switched to the conducting state is increasing over subsequent switching cycles. In other words, the phase in which the first transistor is switched to be in the conducting state in the first operation mode are split to the two phases in which the first transistor is in the conducting state in the first and in the third interval in the second operation mode.

In an implementation, the switching cycle in the first transition mode comprises the first interval, the second interval, the third interval and the fourth interval, which are subsequent intervals in the given order, wherein the time duration of each one of the intervals is equal to the duration of T/2, wherein when switching from the second operation mode to the first operation mode the time interval for which the fourth transistor is switched to be in the conducting state in the third interval in the second operation mode is increasing over subsequent switching cycles in the first transition mode by switching the fourth transistor to the non-conducting state at a later point of time in each switching cycle, the time interval for which the fourth transistor is switched to be in the conducting state in the first interval in the second operation mode is increasing over subsequent switching cycles in the first transition mode by switching the fourth transistor to the conducting state at an earlier point of time in each switching cycle, and the time interval for which the second transistor is switched to be in the conducting state in the fourth interval in the second operation mode is decreasing over subsequent switching cycles in the first transition mode. In other words, the time that the fourth transistor is switched to be in the conducting state is constantly increasing while the time that the second transistor is switched to be in the conducting state is decreasing. Starting with the phases in which the fourth transistor is in the conducting state in the first and in the third interval in the second operation mode, the two phases are increasing and when these phases join to be one constant time interval in which the fourth transistor is continuously in the conducting state, the change from the second operation mode to the first operation mode has completed.

In an implementation, when switching from the first operation mode to the second operation mode in the first transition mode, the time interval for which the fourth transistor is switched to be in the conducting state in the third interval, the fourth interval and the first interval of the following switching cycle in the first operation mode is split into two time intervals by switching the fourth transistor to the non-conducting state and to the conducting state in the fourth interval, wherein the time between these two time intervals is increasing over subsequent switching cycles in the first transition mode, and the second transistor is switched to the conducting state between the two time intervals, wherein the time that the second transistor is switched to the conducting state is increasing over subsequent switching cycles.

In an implementation, the isolated full-bridge converter comprises a clamping circuit, which is configured to clamp a voltage on the primary winding of the transformer to a defined clamping threshold. The voltage on the primary winding of the transformer is a voltage between the input ports of the primary winding. Typically, a voltage on the input ports of the primary winding changes during the transition between different operation modes. In particular, this can be caused by one or more capacitors that are charged or discharged when switching between the operation modes. This leads to an increased voltage that is applied to the primary winding of the transformer. This increased voltage would to the effect that the electrical components of the rectifier on the secondary side of the transformer have to be designed to handle higher voltages and currents, which is avoided by the clamping circuit. Also, the transformer has to be capable for handling the increased magnetic flux that is caused by the increased voltage that is applied to the primary winding of the transformer during the transition between different operation modes, which can be avoided by the clamping circuit. In an implementation, the clamping threshold is set to a voltage that is equal or above a voltage that is generated at the primary winding during the different operation modes.

In an implementation, the clamping circuit comprises two diodes, for example, zener diodes, which are connected in one current path that is connecting the input ports of the primary winding, wherein same poles of the diodes are connected to each other. Thus, a simple and compact clamping circuit can be provided.

In an implementation, the transformer comprises a clamping winding on the primary side, wherein the clamping winding is a part of the clamping circuit, wherein the clamping winding is coupled to a first input port of the isolated full-bridge converter and a second input port of the isolated full-bridge converter via a clamping diode. Such a clamping circuit is reducing a magnetic flux in the transformer and is suitable to avoid undesired effects in the full bridge, such as thermic effects, which are caused by the conducted by the currents that are flowing through the clamping circuit.

In an implementation, the isolated full-bridge converter is configured to operate in a third operation mode (50), wherein the switching cycle of the duration of 2T is repeated to generate a number of subsequent second switching cycles in the third operation mode, wherein the switching cycle comprises the first interval, the second interval, the third interval and the fourth interval, which are subsequent intervals in the given order, wherein the time duration of each one of the intervals is equal to the duration of T/2, the first transistor is switched on twice per switching cycle to be in a conducting state and is switched off twice per switching cycle to be in a non-conducting state, wherein the first transistor is once switched on and then switched off during the first interval and is once switched on and then switched off during the third interval, the third transistor is switched on twice per switching cycle to be in a conducting state and is switched off twice per switching cycle to be in a non-conducting state, wherein the third transistor is once switched on and then switched off during the second interval and is once switched on and then switched off during the fourth interval, the one of the second transistor and the fourth transistor is in a conducting state during the entire switching cycle, and the other one of the second transistor and the fourth transistor is in a non-conducting state during the entire switching cycle, wherein the first transistor and the third transistor are all controlled to be pulsed with a duty cycle having a fourth duration of DT/2, wherein D is a variable parameter. In other words, the first transistor is switched on twice per switching cycle to be in a conducting state in the first interval and the third interval of each switching cycle, and is switched off twice per switching cycle to be in a non-conducting state in the second interval and the fourth interval of the subsequent switching cycles, the third transistor is switched on twice per switching cycle to be in a conducting state in the second interval and the fourth interval of each switching cycle, and is switched off twice per switching cycle to be in a non-conducting state in the first interval and the third interval of the subsequent switching cycles, the one of the second transistor and the fourth transistor is in a conducting state during the entire switching cycle, and the other one of the second transistor and the fourth transistor is in a non-conducting state during the entire switching cycle. In an implementation, the third operation mode is an alternative operation mode to the first operation mode. That is, the isolated full-bridge converter is configured to selectively work in the third operation mode or in the second operation mode. The third operation mode allows that a simplified switching process is provided for the second and the fourth transistor, in particular as the other one of the second transistor and the fourth transistor is in a non-conducting state during the entire switching cycle and needs to control for changing a status. Such third operation mode is a half bridge operation, as one of the second transistor and the fourth transistor is in a conducting state during the entire switching cycle, which practically leads to disabling the second leg of the full bridge.

In an implementation, the full-bridge converter is further configured to operate in a second transition mode, which is applied when switching between the second operation mode and the third operation mode, wherein the switching cycle of the duration of 2T is repeated to generate a number of subsequent second switching cycles, wherein the switching durations of the first to fourth transistor in the second transition mode are morphed from the switching durations of the second operation mode to the switching durations of the third operation mode over multiple second switching cycles when switching from the second operation mode to the third operation mode, wherein a duration in which the one of the second transistor and the fourth transistor is in the conducting state is increasing slower within a first portion of the second transition mode than in a following second portion of the second transition mode, or morphed from the switching durations of the third operation mode to the switching durations of the second operation mode over multiple second switching cycles when switching from the third operation mode to the second operation mode, wherein a duration in which the one of the second transistor and the fourth transistor is in the conducting state is increasing faster within a first portion of the second transition mode than in a following second portion of the second transition mode. In an implementation, the duration in which the one of the second transistor and the fourth transistor is in the conducting state is increasing or decreasing linear in the first portion and in the second portion. In a scenario in which the duration in which the one of the second transistor and the fourth transistor is in the conducting state is increasing continuously over the entire second transition mode, the transition would results in an about 50% larger rectifier blocking voltage at the end of the morphing compared to full-bridge modulation. If such an on-the-fly morphing transition is desired, the rectifier MOSFETs/diodes must be designed for an increased blocking voltage resulting in larger losses and costs. Also, the transition results in imbalanced rectifier currents, which is compensated by the magnetizing current through an offset. This may potentially lead to a saturation of the transformer. To overcome this problem, the transformer must be designed for a larger flux, which consequently results in larger winding losses, larger component costs and larger magnetic components. However, these negative effect can be avoided by changing the duration in which the one of the second transistor and the fourth transistor is in the conducting state in two phases.

The aforementioned negative effects can in particular be avoided when a change between the first portion of the second transition mode and the second portion of the second transition mode is performed at a time when the blocking capacitor is fully charged. In this case, an increased flux density and magnetizing current is avoided. In an implementation, a change between the first portion of the second transition mode and the second portion of the second transition mode is performed at a time when 55% to 80%, in particular 60%, of the overall time of the second transition mode is reached. In an implementation, a switching duration in which the other one of the second transistor and the fourth transistor is in the conducting state is constantly decreasing in during the second transition mode.

In an implementation, the isolated full-bridge converter comprises a snubber circuit that is connected to the secondary winding of the transformer. Such snubber circuit is suitable to cancel voltage peaks that can be caused when disabling a switching operation of any one of the transistors of the full bridge in any operation mode.

In an implementation, the full-bridge converter comprises a transformer in between the primary side of the isolated full-bridge converter and a secondary side of the isolated full-bridge converter, wherein the transformer comprises a clamping winding that is coupled to a first input port of the isolated full-bridge converter and a second input port of the isolated full-bridge converter. Such a clamping winding allows to avoid over voltages of the rectifier semi-conductors and an optional snubber circuit.

In particular advantageous is a full-bridge converter that is configure to be operated in the first operation mode and that additionally comprises a clamping circuit. In particular advantageous is further a full-bridge converter that is configure to be operated in the second operation mode and in the third operation mode that additionally comprises a clamping circuit.

BRIEF DESCRIPTION OF DRAWINGS

Further aspects, details, advantages and features of the disclosure are described based on embodiments of the disclosure and by taking reference to the accompanying figures.

DESCRIPTION OF EMBODIMENTS

Figure 1:
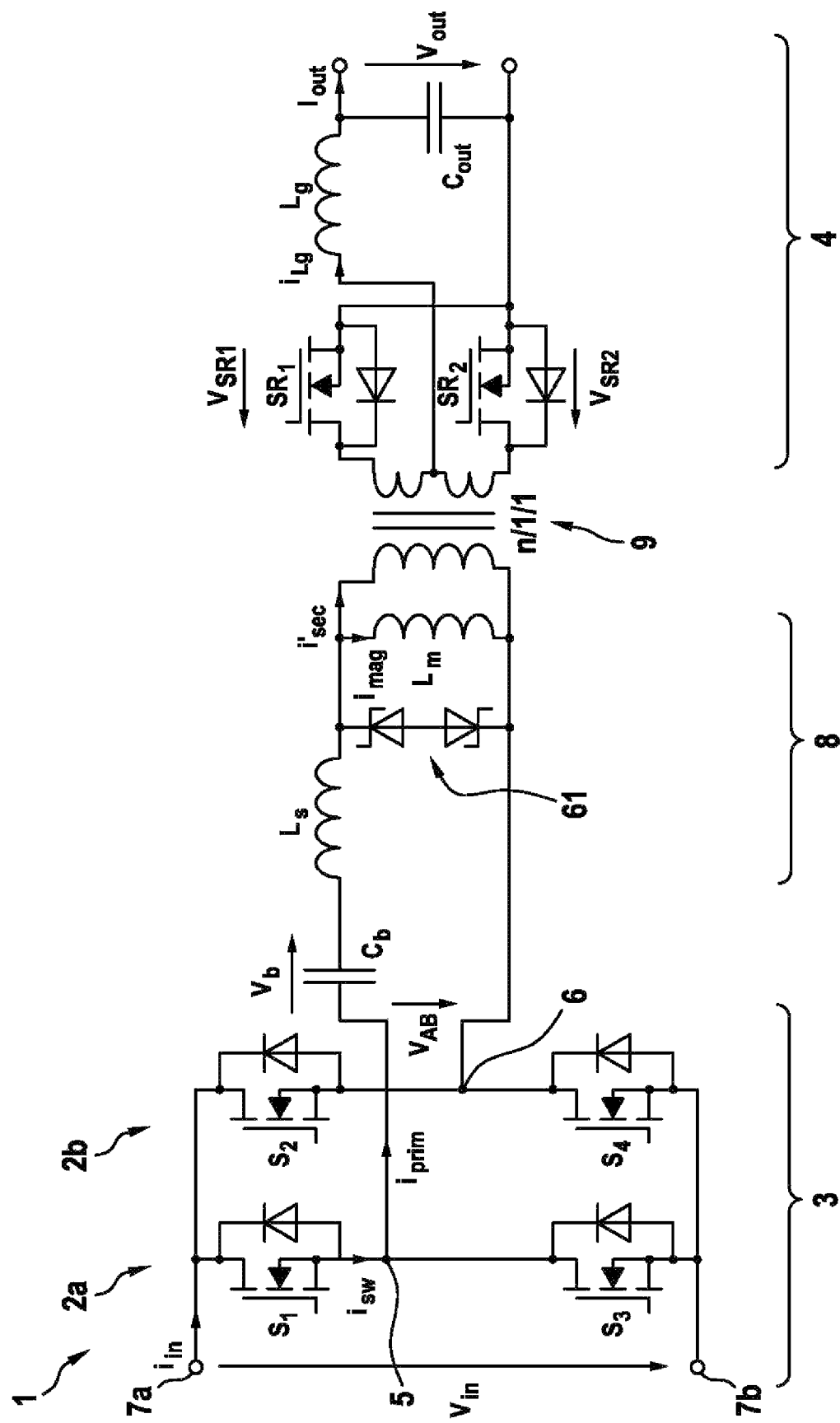
FIG. 1 is illustrating a full-bridge converter according to a first embodiment of the disclosure.

A full-bridge converter 1 according to a first embodiment of the disclosure is illustrated in FIG. 1.

The full-bridge converter 1 comprises a primary side and a secondary side, wherein the primary side and the secondary side are coupled by a transformer 9.

The primary side of the full-bridge converter 1 comprises a full bridge 3 and a resonant circuit 8. The full bridge 3 is a full bridge inverter and is connected to the input ports 7a and 7b of the full-bridge converter 1 to receive an input Voltage $V_{in}$. In particular, the full bridge 3 comprises a first leg 2a and a second leg 2b. The first leg 2a of the full bridge 3 comprises a first transistor S1 and a third transistor S3. The first transistor S1 and the third transistor S3 are connected in series in between the input ports 7a and 7b of the full-bridge converter 1. The second leg 2b of the full bridge 3 comprises a second transistor S2 and a fourth transistor S4. The second transistor S2 and the fourth transistor S4 are connected in series in between the input ports 7a and 7b of the full-bridge converter 1. The transistors of the full bridge 3 are MOSFETs.

In an implementation, the primary side of the full-bridge converter 1 further comprises a resonance circuit 8. The resonance circuit 8 is connecting the output ports 5, 6 of the full bridge 3 with the primary side of the transformer 9.

The full-bridge converter 1 further comprises a blocking capacitor $C_b$ that is connected to the output port 5 of the first leg 2a. In alternative embodiments, the blocking capacitor $C_b$ is connected to the output port 6 of the second leg 2b. According to FIG. 1, the blocking capacitor can be seen as a part of the resonance circuit 8, as the capacitor is also used as a capacity of the resonance circuit 8. However, the capacity is larger than a capacity that is required for the resonance circuit 8. The blocking capacitor $C_b$ is for allowing a current flow through the primary winding of the transformer 9 in any situations within any operation mode in which both of the second and the fourth transistor S2, S4 are switched off to be in a non-conducting state and one of the first and the third transistor S1, S3 is switched on to be in a conducting state. A capacity of the blocking capacitor $C_b$ is selected accordingly.

In an implementation, the primary side of the full-bridge converter 1 further comprises a clamping circuit 61. The clamping circuit 61 is connecting the input ports of the primary winding of the transformer 9 and comprises two zener diodes. The anodes of the two zener diodes are connected to each other and the two cathodes of the two zener diodes are connected to the two input ports of the primary winding of the transformer 9, respectively. Therefore, the clamping circuit 61 comprises two zener diodes which are connected in one current path that is connecting the input ports of the primary winding of the transformer, wherein same poles of the diodes are connected to each other.

The secondary side of the full-bridge converter 1 comprises a rectifier 4 that is coupled to the secondary side of the transformer 9.

The isolated full-bridge converter 1 is configured to selectively operate in one of at least two different operation modes. The full-bridge converter 1 according to the first embodiment is configured to be operated in either a first operation mode 10 or in a second operation mode 20. For switching the full-bridge converter 1 between these operation modes, the full-bridge converter 1 is driven in a first transition mode 30.

The transistors S1 to S4 of the full bridge 3 are driven by a driving circuit according to the operation mode that the full-bridge converter 1 is operated in. The operation of the transistors S1 to S4 according to the first operation mode 10, the second operation mode 20 and the first transition mode 30 are illustrated in FIG. 2.

Figure 2:
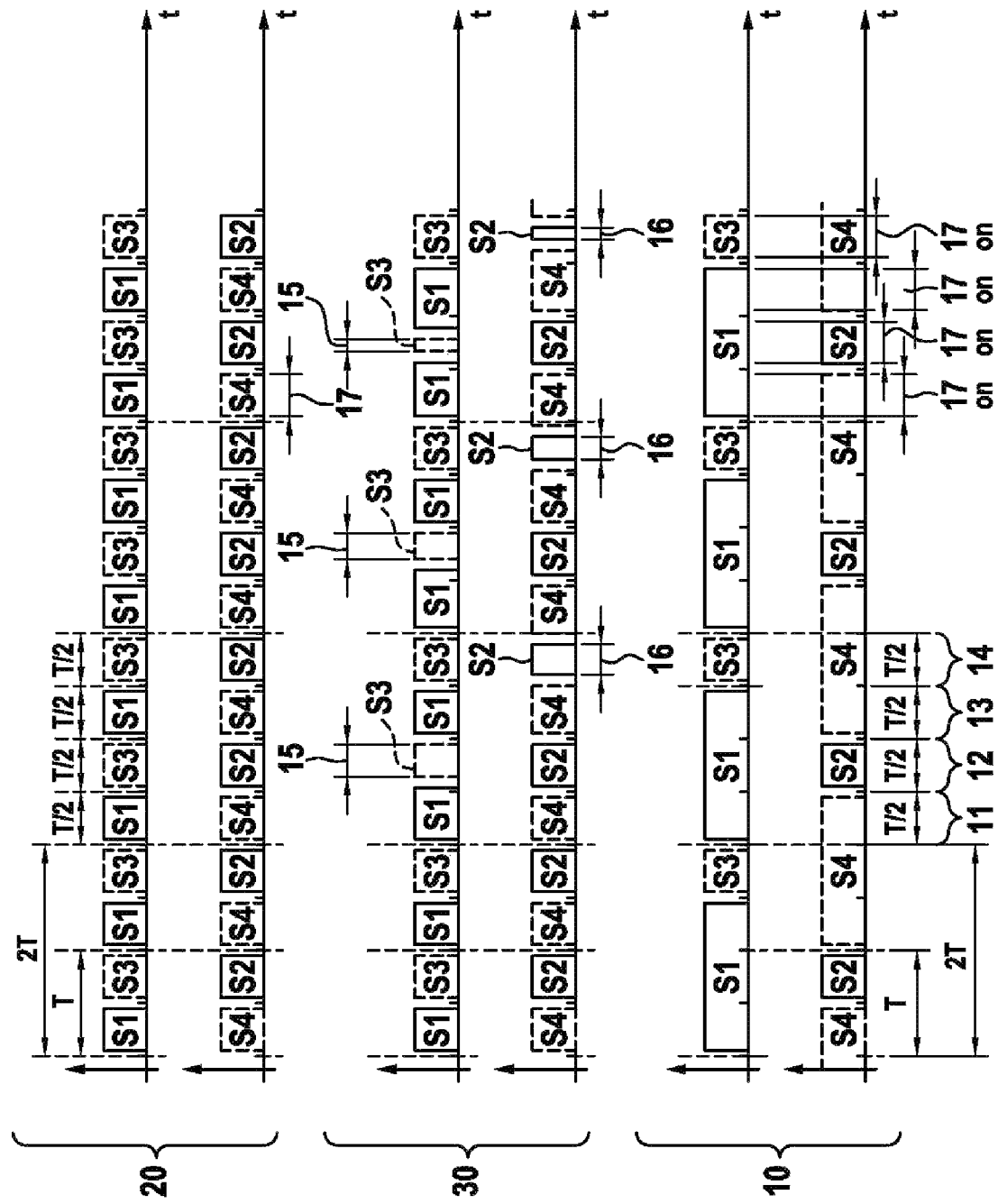
FIG. 2 is illustrating switching processes of the full-bridge converter according to the first embodiment of the disclosure in different operation modes.

The diagrams in FIG. 2 are illustrating the times in which the transistors are switched on and are in a conducting state. If a signal for one of the transistors S1 to S4 is indicated to be high, the respective transistor is in a conducting state. If a signal for one of the transistors S1 to S4 is indicated to be low, the respective transistor is in a non-conducting state. As the transistors of neither leg 2a, nor leg 2b cannot be in a conducting state at the same time and cannot be overlapping in time, the switching states of the transistors of one leg are depicted in one diagram.

The full-bridge converter 1 can be operated in a first operation mode 10, which is providing a hard-switched frequency-doubler half-bridge modulation (HFDM). The full-bridge converter 1 can be further operated in a second operation mode 20, which is providing a full-bridge operation for the full-bridge converter 1.

Referring to FIG. 2, the operation of the full-bridge converter 1 in the first operation mode, the second operation mode and in the first transition mode is shown and it can be seen that a switching cycle of a duration of 2T is repeated to generate a number of subsequent switching cycles for each one of these modes. Referring to the second operation mode, it could also understood that a switching cycle of a duration of T is repeated. However, to allow easier comparison, the twice repetition of the switching cycle of a duration of T are interpreted as one switching cycle of a duration of 2T. The parameter T is a time value and might be variable during the operation of the full-bridge converter 1.

Each switching cycle comprises a first interval 11, a second interval 12, a third interval 13 and a fourth interval 14, which are subsequent intervals in the given order, wherein the time duration of each one of the intervals 11, 12, 13, 14 is equal to a duration of T/2. Consequently, the time durations of the intervals 11, 12, 13, 14 sum up to the duration of the switching cycle.

When the isolated full-bridge converter 1 is operated in a first operation mode 10, the transistors S1 to S4 of the full bridge 3 are driven as described in the following.

The first transistor S1 is switched on after a switching time period in the first interval 11 and is switched off in the third interval 13 of each switching cycle, wherein the first transistor S1 is switched off a switching time period before the third interval 13 ends. No further switching of the first transistor S1 is performed in the switching cycle. Therefore, the first transistor S1 is switched on once per switching cycle to be in a conducting state and is switched off once per switching cycle to be in a non-conducting state, wherein the first transistor S1 is switched on during the first interval 11 and is switched off during the third interval 13 of each switching cycle.

The third transistor S3 is switched on after a switching time period in the fourth interval 14 and is switched off in the fourth interval 14 of each switching cycle, wherein the third transistor S3 is switched off a switching time period before the fourth interval 14 ends. No further switching of the third transistor S3 is performed in the switching cycle. Therefore, the third transistor S3 is switched on once per switching cycle to be in a conducting state and is switched off once per switching cycle to be in a non-conducting state, wherein the third transistor S3 is switched on during the fourth interval 14 and is switched off during the fourth interval 14 of each switching cycle.

The second transistor S2 is switched on after a switching time period in the second interval 12 and is switched off in the second interval 12 of each switching cycle, wherein the second transistor S2 is switched off a switching time period before the second interval 12 ends. No further switching of the second transistor S2 is performed in the switching cycle. Therefore, the second transistor S2 is switched on once per switching cycle to be in a conducting state and is switched off once per switching cycle to be in a non-conducting state, wherein the second transistor S2 is switched on during the second interval 12 and is switched off during the second interval 12 of each switching cycle.

The fourth transistor S4 is switched on after a switching time period in the third interval 13 in one switching cycle and is switched off in the first interval 11 of a following switching cycle, wherein the fourth transistor S4 is switched off a switching time period before the first interval 11 ends. Due to the repetition of the switching cycles, this implies that the fourth transistor S4 is switched off a switching time period before the first interval 11 ends in each switching cycle. No further switching of the fourth transistor S4 is performed in the switching cycle. Therefore, the fourth transistor S4 is switched on once per switching cycle to be in a conducting state and is switched off once per switching cycle to be in a non-conducting state, wherein the fourth transistor S4 is switched on during the third interval 13 of each switching cycle and is switched off during the first interval 11 of a following switching cycle.

The first transistor S1 and the fourth transistor S4 are pulsed with a duty cycle having a first duration of $(2+D)*T/2$, wherein D is adjustable parameter that is set to control the output voltage of the isolated full-bridge converter 1 in the first operation mode. The third transistor S3 and the second transistor S2 are pulsed with a duty cycle having a second duration of $DT/2$. Setting a specific value for the parameter D leads to an increase or decrease of the times in which the respective transistors are in the conducting state. Considering that the duration of the switching cycle is not changed, this leads to an increase or decrease of the duration of the aforementioned switching time periods.

The duty cycles of the first transistor S1 and the fourth transistor S4 are shifted by a duration of T with respect to each other. That is, the fourth transistor S4 is switched on a duration of T after the first transistor S1 was switched on in each switching cycle. The duty cycles of the third transistor S3 and the second transistor S2 are shifted by a duration of T with respect to each other. That is, the third transistor S3 is switched on a duration of T after the second transistor S2 was switched on in each switching cycle.

It is noted that the time intervals in which the transistors are in the non-conducting state according to FIG. 2 are merely exemplary and are typically larger when compared to the time intervals in which the transistors are in the conducting state. That is, the modulation is not to be understood in a way that there are merely dead-times in between consecutive switching cycles. The time intervals in which the transistors are in the conducting state and in the non-conducting state depend on the parameter D, which can be read as a pulse duty factor.

Figure 4:
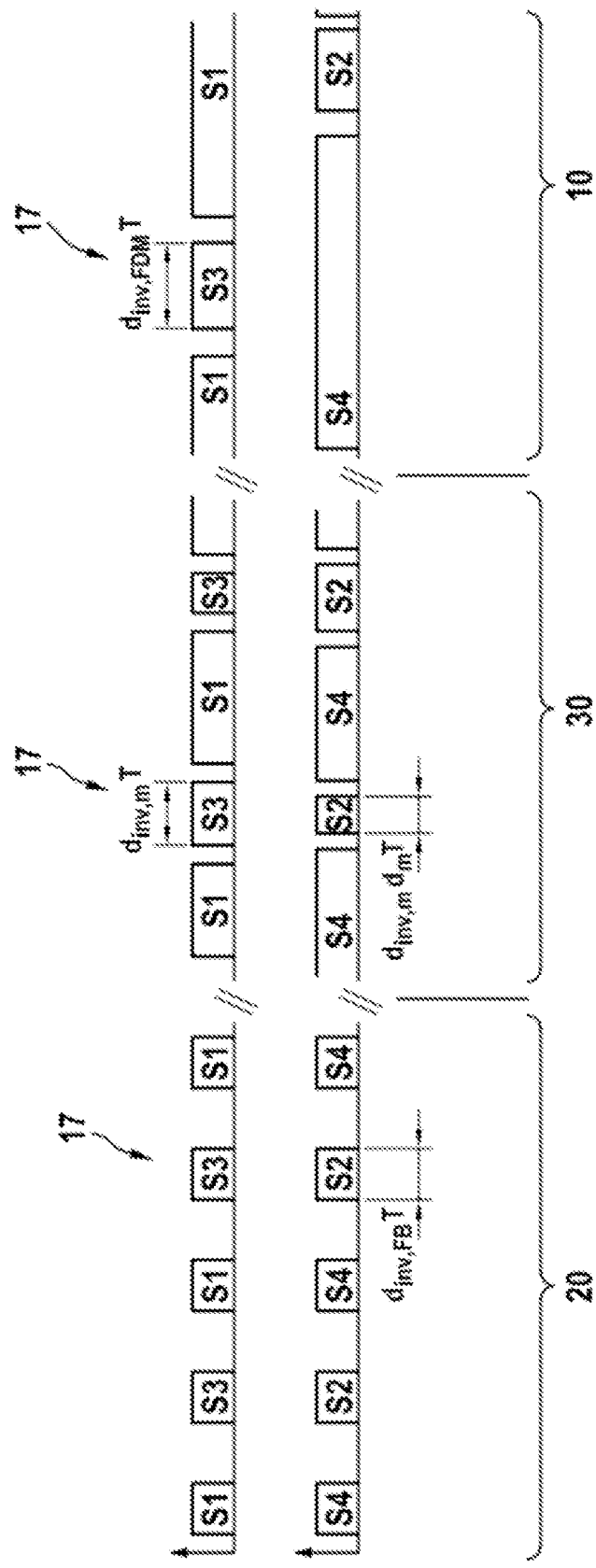
FIG. 4 is illustrating the transition of the full-bridge converter from the second operation mode to the first operation mode.

In this respect, it is also pointed to the alternative illustration of the switching time periods in FIG. 4.

For controlling the switching actions of the transistors S1 to S4, the isolated full-bridge converter 1 is configured to generate a triangular signal having a duty cycle of a duration of 2T. Each one of the transistors S1 to S4 is switched to the conducting state when a corresponding threshold is exceeded by the triangular signal and is switched off when the corresponding threshold is underrun by the triangular signal, which can be achieved by a comparator that is assigned to the respective transistor. The triangular signal and the corresponding threshold values for the comparators are illustrated with the PWM Counter Signal in FIG. 3.

Figure 3:
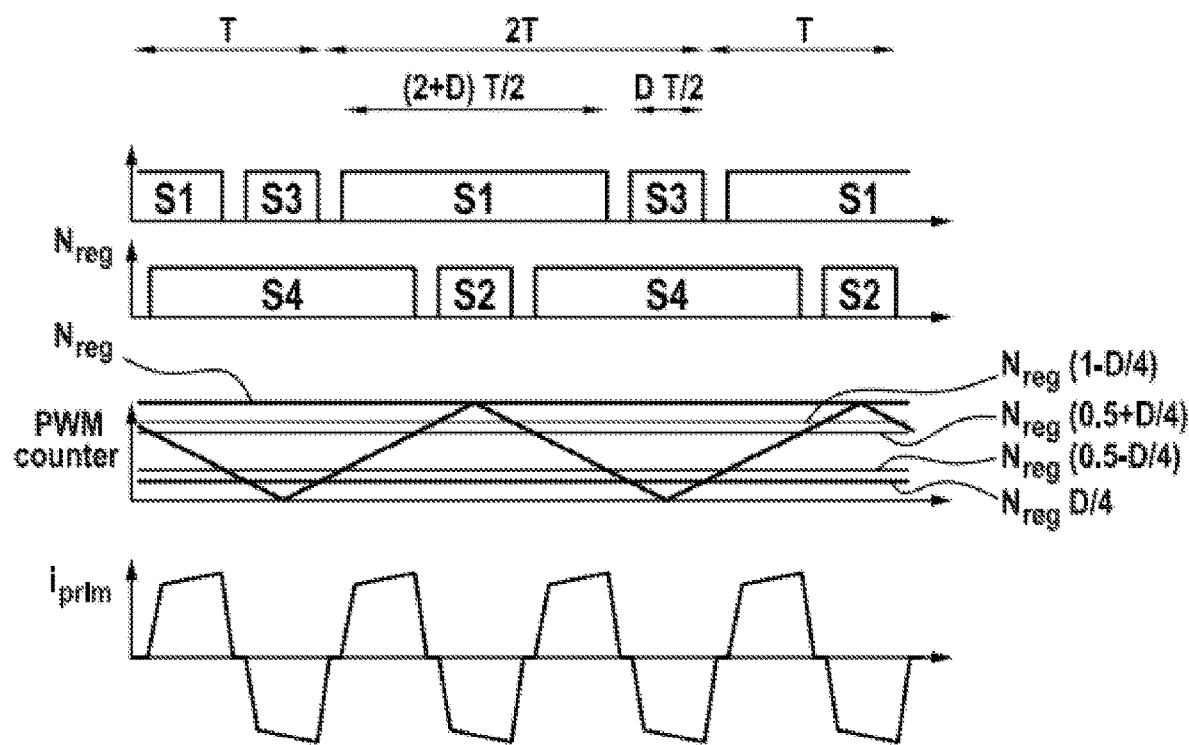
FIG. 3 is illustrating characteristic parameters of the full-bridge converter when operated in the first operation mode.

The first operation mode, that is the frequency doubler operation, improves the unbalanced loss distribution of a half-bridge mode. The loss-balancing operating mode is depicted in FIG. 3. FIG. 3 shows a modulation that results in a voltage over the blocking capacitor $C_b$ of $v_b = V_{in}/2$.

To achieve the inverter voltage, turn-on interval lengths of DT/2 and (2+D)T/2 (with D∈[0, 1]) are used which are phase-shifted for one bridge leg by T. The operating frequency (the frequency of the primary current $i_{prim}$) is therefore twice (doubled) the switching frequency of the bridge legs 2a, 2b.

By employing an up-down counter, the modulation can be achieved using four compare values where every half bridge uses only two. This means that this type of modulation can be easily implemented on a DSP/microcontroller (e.g. in TI C2000 controllers using the action-qualifier control registers, AQCTL) similarly to a loss balancing phase-shift modulation presented. The compare values are $N_{reg}$ (1−D/4), $N_{reg}$ (0.5+D/4), $N_{reg}$ (0.5−D/4), and $N_{reg}$ D/4. If the counter is below $N_{reg}$ (0.5+D/4), the fourth transistor S4 is turned on while for the counter larger $N_{reg}$ (1−D/4), the second transistor S2 is turned on. Similarly, for the counter larger $N_{reg}$ (0.5−D/4), the first transistor S1 is turned on, whereas for the counter smaller $N_{reg}$ D/4, the third transistor S3 is turned on.

During the operation in the first operation mode, two diagonal MOSFETs are pulsed with a duty cycle of DT/2 whereas the other two MOSFETs are pulsed with a duty cycle of (2+D)T/2. The losses of the MOSFETs are $P_{HFDM/high}$ and $P_{HFDM/low}$, respectively.

The losses of the MOSFETs that are turned on for (2+D)T/2 can be calculated as $$P_{high}^{HFDM} = \underbrace{\frac{3}{4} I_{prim}^2 R_{ds,on}(v_j)}_{1.5\ P_{cond,pulse}^{HHBM} = 0.75\ P_{p-os}^{HHBM}} + \underbrace{\frac{1}{2} f_{sw} E_{sw}(i_{off}, V_{in})}_{0.5\ P_{sw,pulse}^{HHBM}}.$$

The over brace comments put these losses in relation to a conventional HHBM while neglecting temperature dependencies of the on-state resistance. The transistors are turned on and off every two periods T of the primary current while the transistors conduct for three quarters of the time. The lower losses $P_{HFDM/low}$ of the switches that are only turned on for DT/2 on the other hand can be calculated as $$P_{low}^{HFDM} = \underbrace{\frac{1}{4} I_{prim}^2 R_{ds,on}(v_j)}_{0.5\ P_{cond,pulse}^{HHBM} = 0.25\ P_{p-os}^{HHBM}} + \underbrace{\frac{1}{2} f_{sw} E_{sw}(i_{off}, V_{in})}_{0.5\ P_{sw,pulse}^{HHBM}}.$$

Thus, the overall losses $P_{inv}$ of this modulation are the same compared to the conventional half-bridge modulation. Furthermore, also the number of switching transitions is the same and always two switches conduct the current.

It is referred back to FIG. 2. When the isolated full-bridge converter 1 is operated in the second operation mode 20, the transistors S1 to S4 of the full bridge 3 are driven as described in the following.

The first transistor and the second transistor are switched to the conducting state in an alternating way, such that only one of the first transistor S1 and the second transistor S2 is in the conducting state at any time. Due to the duration of the switching cycle to be 2T instead of T, this leads to the fact that the first transistor S1 and the second transistor S2 are both switched on and off twice per switching cycle. In between the times in which the first transistor S1 is in the conducting state and the time that the second transistor S2 is in the conducting state there is a switching time period in each interval to avoid simultaneous on-times.

Thus, the first transistor S1 is switched on twice per switching cycle to be in a conducting state in the first interval 11 and the third interval 13 of each switching cycle, and is switched off twice per switching cycle to be in a non-conducting state in the second interval 12 and the fourth interval 14 of the subsequent switching cycles, and the third transistor S3 is switched on twice per switching cycle to be in a conducting state in the second interval 12 and the fourth interval 14 of each switching cycle, and is switched off twice per switching cycle to be in a non-conducting state in the first interval 11 and the third interval 13 of the subsequent switching cycles.

The fourth transistor S4 is switched according to the first transistor S1 and the second transistor S2 is switched according to the third transistor S3. Thus, the second transistor S2 and the fourth transistor S4 are switched to the conducting state in an alternating way, such that only one of the second transistor S2 and the fourth transistor S4 is in the conducting state at any time. Due to the duration of the switching cycle to be 2T instead of T, this leads to the fact that the second transistor S2 and the fourth transistor S4 are both switched on and off twice per switching cycle. In between the times in which the second transistor S2 is in the conducting state and the time that the fourth transistor S4 is in the conducting state there is a switching time period in each interval to avoid simultaneous on-times.

Thus, the second transistor S2 is switched on twice per switching cycle to be in a conducting state in the second interval 12 and the fourth interval 14 of each switching cycle, and is switched off twice per switching cycle to be in a non-conducting state in the first interval 11, the third interval 13 of the subsequent switching cycles, and the fourth transistor S4 is switched on twice per switching cycle to be in a conducting state in the first interval 11 and the third interval 13 of each switching cycle, and is switched off twice per switching cycle to be in a non-conducting state in the second interval 12 and the fourth interval 14 of the subsequent switching cycles.

When the isolated full-bridge converter 1 is operated in the first transition mode 30, the transistors S1 to S4 of the full bridge 3 are driven as described in the following.

In the first transition mode 30, the switching durations of the first to fourth transistor S1, S2, S3, S4 are morphed from the switching durations of the second operation mode 20 to the switching durations of the first operation mode 10 over multiple second switching cycles when switching from the second operation mode 20 to the first operation mode 10 or are morphed from the switching durations of the first operation mode 10 to the switching durations of the second operation mode 20 over multiple second switching cycles when switching from the first operation mode 10 to the second operation mode 20. That is, the switching points at which the transistors are switched are shifted over multiple switching cycles to allow a smooth transition between the first operation mode 10 and the second operation mode 20. This might be done in different ways, as the number of intervals in which each transistor is in the conducting state per switching cycle has to be reduced/increased, depending on a direction of the transition. The switching operation that are described in the following allow that a good loss distribution is ensured during the first transition mode 30.

It is assumed that the transition mode 30 is used for a transition from the second operation mode to the first operation mode.

In this case, the time interval for which the first transistor S1 is switched to be in the conducting state in the first interval 11 in the second operation mode 20 is increasing over subsequent switching cycles in the first transition mode 30 by switching the first transistor S1 to the non-conducting state at a later point of time in each switching cycle. Simultaneously, the time interval for which the first transistor S1 is switched to be in the conducting state in the third interval 13 in the second operation mode 20 is increasing over subsequent switching cycles in the first transition mode 30 by switching the first transistor S1 to the conducting state at an earlier point of time in each switching cycle.

That is, as can be seen from FIG. 2, the on-time of the first transistor S1 in the first interval is extending towards the second interval 12 and the on-time of the first transistor S1 in the third interval 13 is also extending towards the second interval 12, which is done until these on-time intervals meet, for example, in the middle of the second interval 12. The on-time 15 of the third transistor S3 in the second interval 12 is reduced accordingly, which means that the time interval for which the third transistor S3 is switched to be in the conducting state in the second interval 12 in the second operation mode 20 is decreasing over subsequent switching cycles in the first transition mode 30. Therefore, two separate on-time intervals of the second operation mode are merged to one on-time interval of the first operation mode.

A similar transition is used for the transition of switching operations of the second transistor S2 and the fourth transistor S4. The time interval for which the fourth transistor S4 is switched to be in the conducting state in the third interval 13 in the second operation mode 20 is increasing over subsequent switching cycles in the first transition mode 30 by switching the fourth transistor S4 to the non-conducting state at a later point of time in each switching cycle. The time interval for which the fourth transistor S4 is switched to be in the conducting state in the first interval 11 in the second operation mode 20 is increasing over subsequent switching cycles in the first transition mode 30 by switching the transistor S4 to the conducting state at an earlier point of time in each switching cycle.

That is, as can be seen from FIG. 2, the on-time of the fourth transistor S4 in the first interval 11 is extending towards the fourth interval 14 of a preceding switching cycle and the on-time of the fourth transistor S4 in the third interval 13 is extending towards the fourth interval 14, which is done until these on-time intervals meet, for example, in the middle of the fourth interval 14. The on-time 16 of the second transistor S2 in the fourth interval 14 is reduced accordingly, which means that the time interval for which the second transistor S2 is switched to be in the conducting state in the fourth interval 14 in the second operation mode 20 is decreasing over subsequent switching cycles in the first transition mode. Therefore, two separate on-time intervals of the second operation mode are merged to one on-time interval of the first operation mode.

It is assumed that the first transition mode 30 is used for a transition from the second operation mode to the first operation mode. In this case, the operations that are performed in the first transition mode 30 during a transition from the first operation mode to the second operation mode are performed in an opposite direction.

The time interval for which the first transistor S1 is switched to be in the conducting state in the first interval 11, the second interval 12 and the third interval 13 in the first operation mode 10 is split into two time intervals by switching the first transistor to the non-conducting state and switching the first transistor S1 to the conducting state in the second interval 12, wherein the time between these two time intervals is increasing over subsequent switching cycles in the first transition mode 30. The third transistor S3 is switched to the conducting state between the two time intervals, wherein the time that the third transistor is switched to the conducting state is increasing over subsequent switching cycles.

The time interval for which the fourth transistor S4 is switched to be in the conducting state in the third interval 13, the fourth interval 14 and the first interval 11 of the following switching cycle in the first operation mode 10 is split into two time intervals by switching the transistor S4 to the non-conducting state and to the conducting state in the fourth interval (14), wherein the time between these two time intervals is increasing over subsequent switching cycles in the first transition mode 30, and the second transistor S2 is switched to the conducting state between the two time intervals, wherein the time that the transistor S2 is switched to the conducting state is increasing over subsequent switching cycles.

An exemplary sequence for a transition from the second operation mode 20 to the first operation mode 10 is depicted in FIG. 4, from which it can be seen that the operation modes 10, 20, 30 are performed sequentially. It can also be seen, that the on-times 17 of the transistors in one of the intervals 11, 12, 13, 14 are not necessarily identical in the different operation modes 10, 20, 30.

Figure 5:
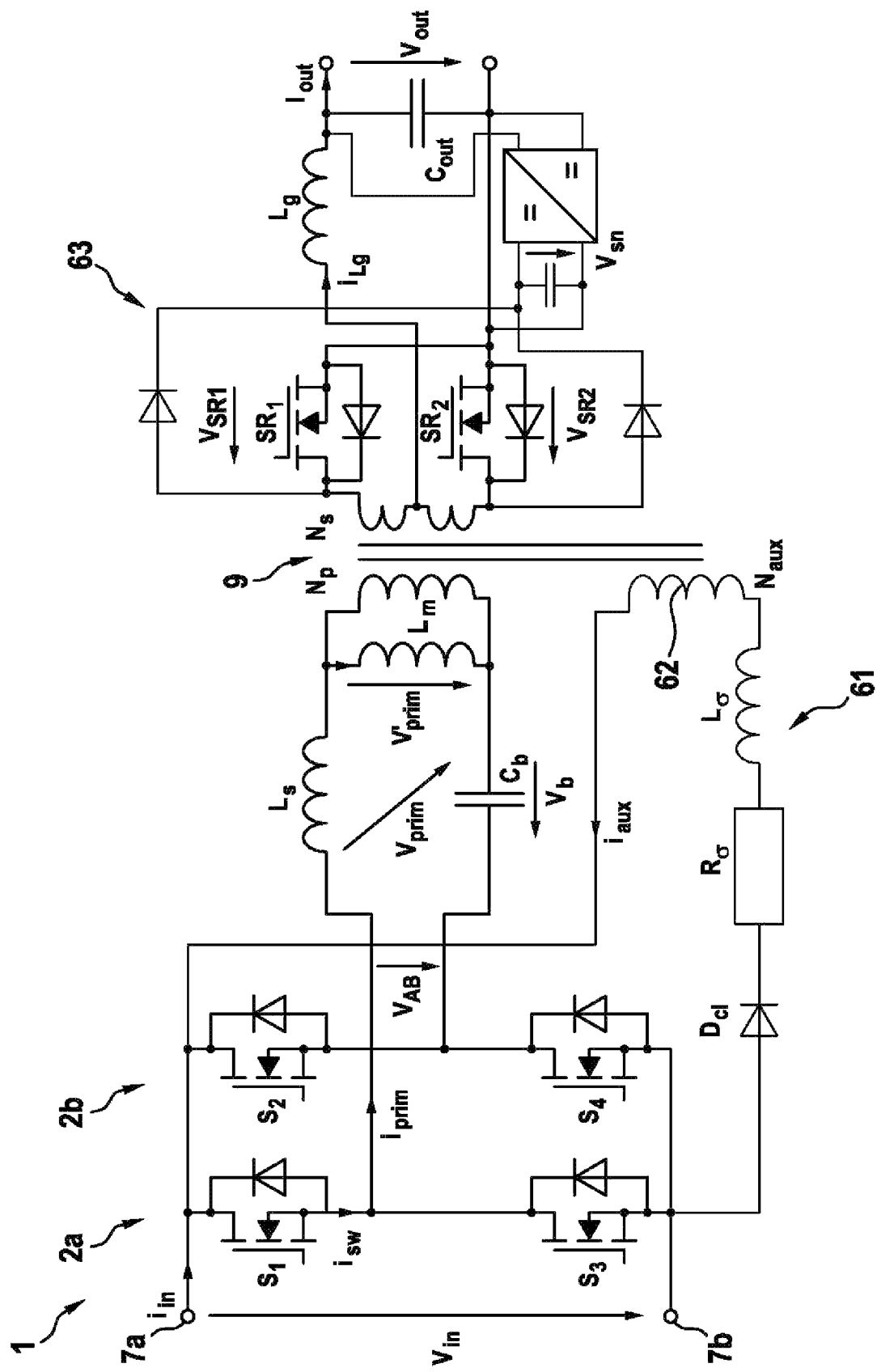
FIG. 5 is illustrating a full-bridge converter according to a second embodiment of the disclosure.

A full-bridge converter 1 according to a second embodiment of the disclosure is illustrated in FIG. 5. The full-bridge converter 1 according to a second embodiment of the disclosure essentially comprises the same layout as the full-bridge converter 1 according to the first embodiment of the disclosure.

However, the full-bridge converter 1 comprises an alternative clamping circuit 61. That is, the transformer 9 additionally comprises a clamping winding 62 that is coupled to a first input port 7a of the isolated full-bridge converter and the second input port 7b of the isolated full-bridge converter 1, wherein a clamping diode $D_{cl}$ is serially connected in between the second input port 7b and the clamping winding 62, forming the clamping circuit 61. It is noted that a clamping resistor $R_o$ and a clamping inductivity $L_o$ are also depicted in FIG. 5, which are connected in series with the clamping diode $D_{cl}$. However, the clamping resistor $R_o$ and the clamping inductivity $L_o$ are not necessarily discrete electric components but are illustrated to indicate the presence of a parasitic inductivity and resistance. Further than that, the full-bridge converter 1 additionally comprises a snubber circuit 63 on the secondary side. Therefore, the transformer comprises a clamping winding on the primary side of the transformer, wherein the clamping winding is a part of the clamping circuit 61, wherein the clamping winding is coupled to the first input port 7a of the isolated full-bridge converter 1 and the second input port 7b of the isolated full-bridge converter 1 via the clamping diode $D_{cl}$.

The full-bridge converter 1 can be operated in the second operation mode 20, which is equivalent to the second operation mode 20 of the first embodiment.

Further than that the full-bridge converter 1 can be operated in a third operation mode 50. Also in the third operation mode 50, the switching cycle of the duration of 2T is repeated to generate a number of subsequent second switching cycles in the third operation mode 50, wherein the switching cycle comprises the first interval 11, the second interval 12, the third interval 13 and the fourth interval 14, which are subsequent intervals in the given order, wherein the time duration of each one of the intervals 11, 12, 13, 14 is equal to the duration of T/2.

The third operation mode 50 is providing a half bridge operation of the full-bridge converter 1. That is, either the second transistor S2 or the fourth transistor S4 is switched to the non-conducting state over the entire switching cycle and the other one of the second transistor S2 or the fourth transistor S4 is switched to the conducting state over the entire switching cycle. The operation of the first transistor S1 and the third transistor S3 of the second operation mode 20 is essentially maintained in the third operation mode 50, while the on-times 17 within the intervals 11, 12, 13, 14 can increase, which leads to shorter switching time periods in between the on-times 17.

Figure 6:
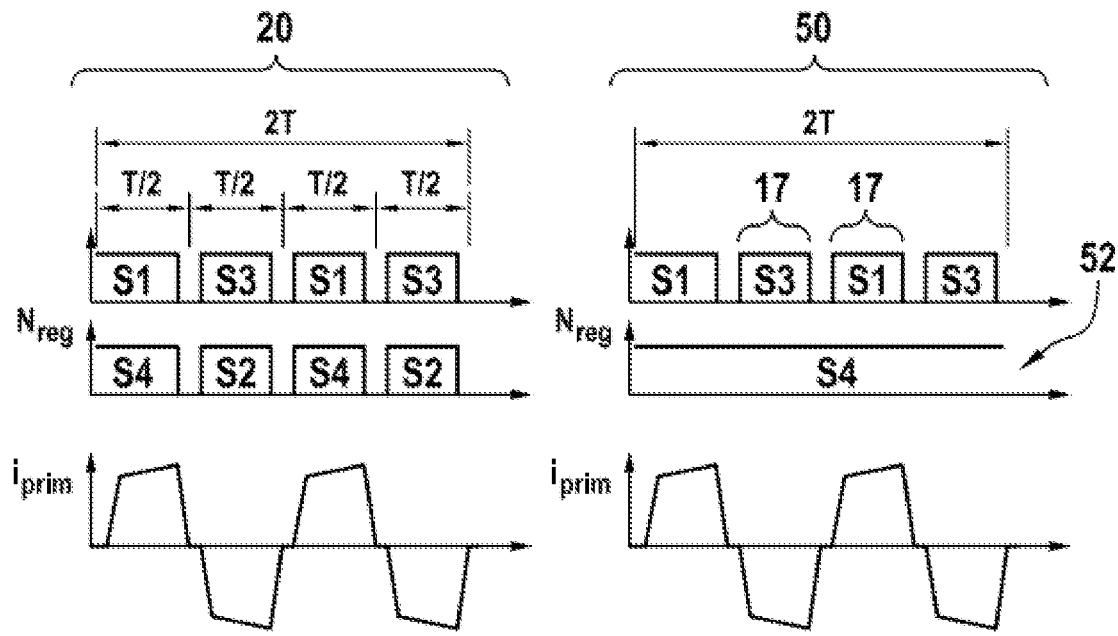
FIG. 6 is illustrating switching processes of the full-bridge converter according to the second embodiment of the disclosure in different operation modes.
Figure 7:
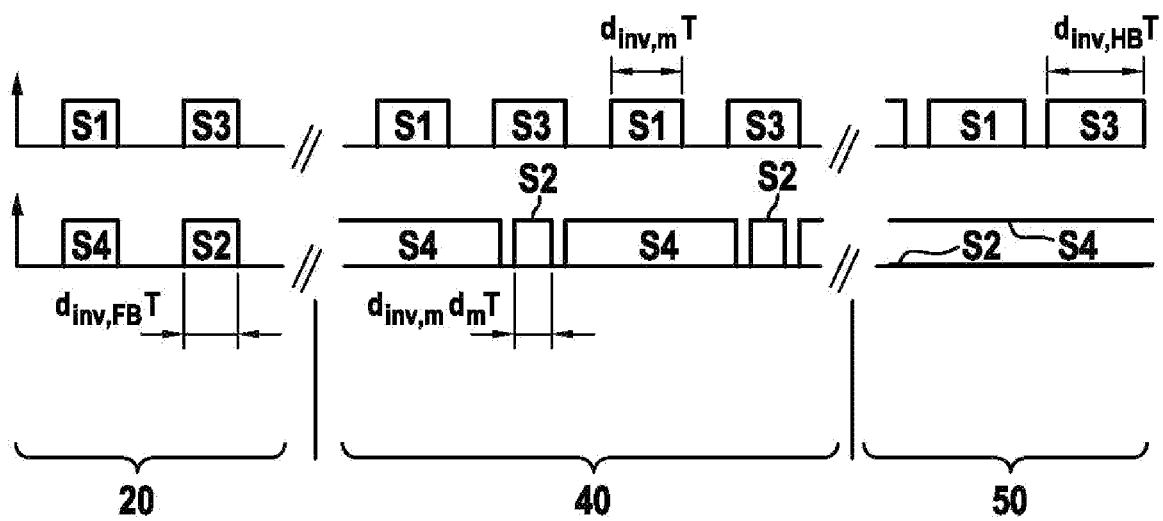
FIG. 7 is illustrating the transition of the full-bridge converter from the third operation mode to the first operation mode.

By means of example, and as illustrated with FIG. 6, the second transistor S2 is switched to the non-conducting state over the entire switching cycle and the fourth transistor S4 is switched to the conducting state over the entire switching cycle in the third operation mode 50.

Thus, the first transistor S1 is switched on twice per switching cycle to be in a conducting state in the first interval 11 and the third interval 13 of each switching cycle, and is switched off twice per switching cycle to be in a non-conducting state in the second interval 12 and the fourth interval 14 of the subsequent switching cycles. The third transistor S3 is switched on twice per switching cycle to be in a conducting state in the second interval 12 and the fourth interval 14 of each switching cycle, and is switched off twice per switching cycle to be in a non-conducting state in the first interval 11 and the third interval 13 of the subsequent switching cycles.

When changing between the second operation mode 20 and the third operation mode a second transition mode 40 is applied. Also in the second transition mode 40 the switching cycle of the duration of 2T is repeated to generate a number of subsequent second switching.

In the second transition mode 40 the switching durations of the first to fourth transistor S1, S2, S3, S4 are morphed from the switching durations of the second operation mode 20 to the switching durations of the third operation mode 50 over multiple second switching cycles.

That is, the switching durations of the second operation mode 20 are morphed to the switching durations of the third operation mode 50 over multiple second switching cycles when switching from the second operation mode 20 to the third operation mode 50. Accordingly, the switching durations of the third operation mode 50 are morphed to the switching durations of the second operation mode 20 over multiple second switching cycles when switching from the third operation mode 50 to the second operation mode 20.

In full-bridge mode, that is in the second operation mode 20, the inverter voltage is actively pulsed between $v_{AB} \in \{-V_{in}, V_{in}\}$ while in half-bridge mode, that is in the third operation mode 50, the inverter voltage is pulsed between $v_{AB} \in \{0, V_{in}\}$. During the morphing transition, that is during the second transition mode 40, however, the inverter voltage levels are pulsed between $v_{AB} \in \{-V_{in}, 0, V_{in}\}$ and the transformer voltage is calculated as $v_{prim}=v_{AB}+v_b$, whereas the blocking capacitor voltage increases from $v_b=0$ (full-bridge mode) to $v_b=V_{in}/2$ in half-bridge mode. Therefore, just before the end of the on-the-fly morphing ($v_b \approx V_{in}/2$), the voltage levels applied to the transformer 9 are $v_{prim} \in \{-V_{in}/2, V_{in}/2, 3V_{in}/2\}$ such that the maximum transformer voltage is increased by 50% compared to the conventional full-bridge operation, unless this is avoided by means of the clamping circuit 61. The primary transformer voltage is proportional to the blocking voltage of the synchronous rectifiers. This means that when employing this transition without the clamping circuit 61, the synchronous rectifiers must be designed for a larger blocking voltage, which comes with larger losses and costs.

Also, unless the clamping circuit 61 is provided, the magnetizing current would increase significantly during the transition between the second and the third operation mode.

Therefore, unless the clamping circuit 61 is provided, a continuous, uninterrupted morphing is only possible by employing rectifier semiconductors with an about 50% higher blocking voltage and by using a transformer with a sufficient margin of the flux density. As this results in larger semiconductor die area, increased losses, and reduced power density, this solution comes with a large cost. To utilize semiconductors of smaller blocking voltage and reduce the transformer volume, the clamping circuit 61 for transformer clamping method is provided, which avoids voltage peaks at the rectifier semiconductors. Furthermore, an increased flux density and magnetizing current is avoided by utilizing a modified control method.

The increased blocking voltage is avoided by the clamping winding, which is depicted in FIG. 5. The clamping winding is connected to the input through the clamping diode $D_{cl}$. The circuit additionally shows an active snubber on the secondary side (shown in bold) to avoid over-voltages that are caused by the inductive termination of the circuit, the series inductance, and the output capacitance of the rectifiers 4. The snubber is required independently of the employed morphing concept.

If the primary transformer voltage $v_{prim}$ surpasses the threshold $v_{prim/clamp}$ that is determined by the turns number $N_{aux}$ of the clamping winding, the diode of this winding starts conducting and the primary transformer voltage is clamped to the level $$v_{clamp}^{prim} = \frac{N_p}{N_{aux}} V_{in} + L_\sigma \frac{di_{aux}}{dt} + R_\sigma i_{aux}.$$

Therefore, the secondary rectifier voltage is clamped to the voltage level $$v_{clamp}^{sec} = v_{clamp}^{prim} \frac{kN_s}{N_p},$$

where k is the rectifier coefficient with k=1 for a full-bridge rectifier and k=2 for the center tapped rectifier.

Neglecting the stray inductance $L_\sigma$ and stray resistance $R_\sigma$, the clamping diode Da must be dimensioned for the maximum reverse voltage. The reverse voltage is calculated as $$V_{clamp,rev} = \begin{cases} V_{in}\left(1 + \frac{N_{aux}}{N_p}\right) & \text{if FBM} \\ V_{in}\left(1 + \frac{N_{aux}}{2N_p}\right) & \text{if HBM} \end{cases},$$

where FBM is the full-bridge mode and HBM is the half-bridge mode. Depending on the maximum input voltage and the selection of the operating regions, the maximum reverse voltage can, thus, appear either in full-bridge or half-bridge mode.

During the clamping interval, the voltage difference between the primary voltage $v_{prim}$ and the clamping voltage $v_{prim/clamp}$ is applied to the series inductance, which can be a discrete inductor or a primary stray inductance. During clamping, three windings are conducting current such that the three-winding stray inductance model must be applied. The series inductor voltage is calculated as $$v_{Ls} = v_{prim} - v_{clamp}^{prim} = V_{in} + v_b - \frac{N_p}{N_{aux}} V_{in} - L_{\sigma,aux} \frac{di_{aux}}{dt} - R_\sigma i_{aux}$$

and is causing a steep current increase during the clamping interval. The current slope $di_{prim}/dt$ $$\frac{di_{prim}}{dt} = \frac{v_{Ls}}{L_s}$$

is hereby determined by the series inductance. The maximum auxiliary current peak can be calculated with the period T as $$\hat{i}_{aux} = \frac{i_{clamp} v_{Ls}}{L_s} = \frac{d_2 T v_{Ls}}{L_s}$$

emphasizing that the maximum auxiliary current can be influenced by the clamping duration $t_{clamp}$ (through the switching frequency) and the series inductance $L_s$. Since the primary inductance $L_s$ determines both the maximum auxiliary current and the duty cycle loss interval length, a tradeoff must be found to achieve a reasonable duty cycle loss and maximum clamping current. Special attention must, thus, be given to the choice of the primary inductance $L_s$. The clamping voltage is also influenced by the stray inductance $L_{\sigma,aux}$. Any stray inductance of the auxiliary winding increases the clamping voltage level. Therefore, it is important to achieve an optimal coupling coefficient between the primary winding and the auxiliary winding.

In an implementation, a duration in which the second transistor S2 is in the conducting state is increasing slower within a first portion 70 of the second transition mode 40 than in a following second portion 71 of the second transition mode 40.

Figure 8:
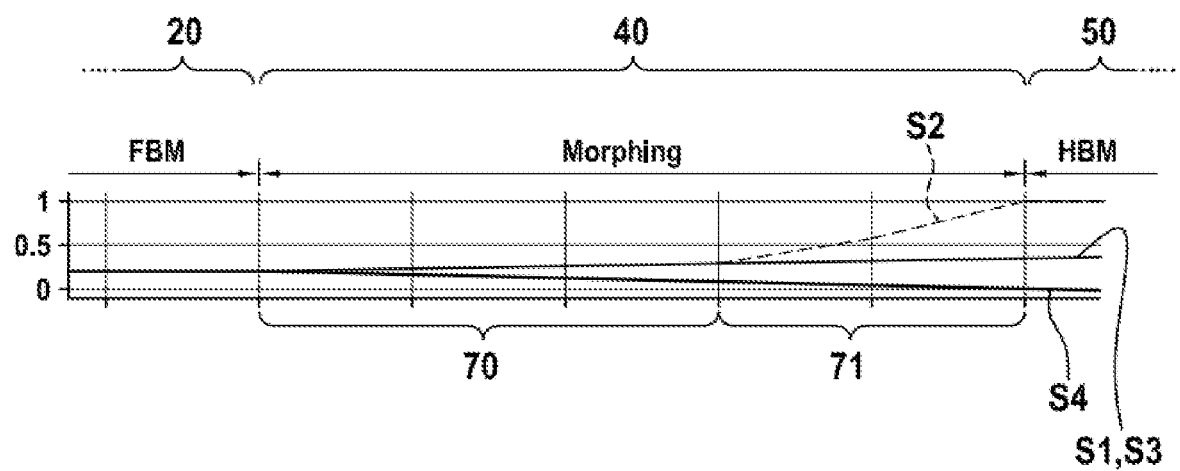
FIG. 8 is illustrating a length of switched-on times of the transistors of the full-bridge converter in a second transition mode.

The duration d2 in which the second transistor S2 is in the conducting state over the second transition mode 40 is depicted in FIG. 8. It can be seen that the increase rate of the duration d2 is increasing at the end of the second transition mode 40. The time at which the rate is increasing is a time when the blocking capacitor $C_b$ is fully charged. Thus, there is a first portion 70 of the second transition mode and a second portion 71 of the second transition mode, wherein the second portion 71 starts at the end of the first portion 70 when the blocking capacitor $C_b$ is fully charged.

The durations d1, d3 and d4 in which the first transistor S1, the third transistor S3 and the fourth transistor S4 are in the conducting state over the second transition mode 40, respectively, are also depicted in FIG. 8. It can be seen that the durations d1, d3 in which the first transistor S1 and the third transistor S3 are in the conducting state are constantly increasing during the entire second transition mode 40 and therefore in the first portion 70 and the second portion 71 of the second transition mode 40. The duration d4 in which the fourth transistor S4 is in the conducting state is constantly increasing during the entire second transition mode 40 and therefore in the first portion 70 and the second portion 71 of the second transition mode 40, until a time of "0" is reached and the fourth transistor S4 is in the non-conducting state over the entire switching cycle.

The root cause of the magnetizing current offset is the small absolute current slope when S1 is turned off while S4 remains turned on. During the beginning of the morphing, the current slope is small since only the (still small) blocking capacitor voltage is applied to magnetics. To overcome this, S4 can be pulsed with an equal duty cycle compared to S1 and S3.

This increases the undesired small absolute current slope after the turn-off of S1 as the current is forced through the body diodes of S2 and S3. The primary voltage $v_{prim}$ is increased from $v_{prim}=-v_b$ to $v_{prim}=-V_{in}-v_b$.

After the blocking capacitor is fully charged (when d2=0), the duty cycle of S4 can then be increased linearly until it is permanently turned on.

During the morphing (that is the transition), the maximum magnetizing current value increases by 34% compared to full-bridge modulation, which is significantly smaller compared to the conventional case in which a switching duration of second transistor would be increased linearly over the entire transition.

The magnetizing current increase is now caused by the clamping intervals. The positive clamping current increases the momentary average current $i'_{sec}=i_{prim}-i_{mag}$, which in turn results in a positive magnetizing current offset.

When the charging of the blocking capacitor is eventually completed (d2=0), there is still a remaining magnetizing current offset. The cause of this offset is a difference in the current slope.

When all drive signals are low (while d4=d1=d3) and there is still a primary current flowing ($|i_{prim}|>0$), there is an imbalance in the duration until the primary current reaches zero. When the drive signals are low while $i_{prim}>0$ (succeeding a turn-on of S1 and S4), the voltage applied to the series inductance is $v_{Ls,neg}=-V_{in}-V_b$, resulting in a very steep fall time $t_{fall}$ after the turn-off current $\hat{i}_{prim}$, $$t_{fall} = L_s \frac{\hat{i}_{prim}}{v_{Ls,neg}}.$$

When all gate signals are low for $i_{prim}<0$ (after the turn-on of S2, S3), the voltage is $v_{Ls,pos}=V_{in}-V_b$, resulting in a larger rise time $t_{rise}$ after the turn-off current $|\check{i}_{rise}|$, which is $$t_{rise} = L_s \frac{|\check{i}_{prim}|}{v_{Ls,pos}}.$$

This difference in the duty cycle-loss intervals adds to magnetizing current offset and can be identified after completion of the morphing transition t>100 ms. The magnetizing current offset $\Delta i_{mag,\Delta t}$ can be calculated as $$\Delta i_{mag,\Delta t} = \frac{|\check{i}_{prim}| t_{rise}}{2} - \frac{\hat{i}_{prim} t_{fall}}{2}}{T}.$$

If the influence of the magnetizing current $i_{mag}$ on the series inductor current $i_{prim}$ is small ($|\check{i}_{prim}| \approx \hat{i}_{prim}$), the fall time $t_{fall}$ is about a third of the rise time $t_{rise}$ at the end of the morphing time as $|v_{Ls,neg}|=3v_{Ls,pos}$ for $V_b=\frac{1}{2} V_{in}$. Depending on the chosen set of parameters, this offset can be quite large.

A morphing modulation in the second transition mode with a clamping winding still shows a considerable magnetizing current offset resulting in an about 34% larger current value compared to the steady-state modulation.

The offset is primarily caused by the clamping current. The amplitude of the clamping current peaks in the auxiliary current $f_{aux}$ are hereby frequency-dependent as is the magnetizing current ripple. By increasing the switching frequency during the transition, it is, therefore, possible to reduce the dynamic magnetizing current offset and decrease the magnetizing current ripple to fully compensate the offset. To avoid an increased magnetizing current, the frequency is increased by 50% before the start of the morphing transition and again reduced after 60% of the morphing time. The reduction may be necessary as the relative duty cycle loss is larger for increased switching frequencies, which may prevent a sufficient gain near half-bridge mode if the switching frequency is not reduced. Additionally, the duty cycle d4 is increased after 60% of the morphing time.

Additionally, an imbalance of the rectifier currents can somewhat compensate the effects of the clamping current.

What is claimed is:

1. An isolated full-bridge converter, configured to selectively operate in one of at least two different operation modes, and comprising:
    a primary side, comprising an inverter that comprises a full bridge which comprises a first leg and a second leg, the first leg comprising a first transistor and a third transistor, the second leg comprising a second transistor and a fourth transistor, wherein the first transistor and the second transistor are connected to a first input port of the isolated full-bridge converter and the third transistor and the fourth transistor are connected to a second input port of the isolated full-bridge converter,
    a secondary side, comprising a rectifier, and
    a transformer, comprising a primary winding that is coupled to the primary side and a secondary winding that is coupled to the secondary side;
    wherein the at least two different operation modes comprise a number of subsequent switching cycles, each of the switching cycles is of a duration of 2T and comprises a first interval, a second interval, a third interval and a fourth interval, which are subsequent intervals in a given order, and the time duration of each of the intervals is equal to a duration of T/2, and wherein the first transistor, the second transistor, the third transistor and the forth transistor are switched on and off in different orders and by different times and have different duty cycles in the at least two different operation modes respectively.

2. The isolated full-bridge converter according to claim 1, wherein the isolated full-bridge converter is configured to generate a triangular signal having a duty cycle of a duration of 2T, wherein each one of the transistors is switched to the conducting state when a corresponding threshold is exceeded by the triangular signal and is switched off when the corresponding threshold is underrun by the triangular signal.

3. The isolated full-bridge converter according to claim 1, wherein the isolated full-bridge converter is configured to operate in a first operation mode in which:
    the first transistor is switched on once per switching cycle to be in a conducting state and is switched off once per switching cycle to be in a non-conducting state, wherein the first transistor is switched on during the first interval and is switched off during the third interval of each switching cycle,
    the third transistor is switched on once per switching cycle to be in a conducting state and is switched off once per switching cycle to be in a non-conducting state, wherein the third transistor is switched on during the fourth interval and is switched off during the fourth interval of each switching cycle,
    the second transistor is switched on once per switching cycle to be in a conducting state and is switched off once per switching cycle to be in a non-conducting state, wherein the second transistor is switched on during the second interval and is switched off during the second interval of each switching cycle,
    the fourth transistor is switched on once per switching cycle to be in a conducting state and is switched off once per switching cycle to be in a non-conducting state, wherein the fourth transistor is switched on during the third interval of each switching cycle and is switched off during the first interval, of a following switching cycle,
    wherein the first transistor and the fourth transistor are pulsed with a duty cycle having a first duration of (2+D)*T/2, and
    wherein the third transistor and the second transistor are pulsed with a duty cycle having a second duration of DT/2, wherein D is a variable parameter, and the isolated full-bridge converter is configured to modify the value of the parameter D to control an output voltage or output current of the isolated full-bridge converter in the first operation mode.

4. The isolated full-bridge converter according to claim 3, wherein the duty cycles of the first transistor and the fourth transistor are shifted by a duration of T with respect to each other, and wherein the duty cycles of the third transistor and the second transistor are shifted by a duration of T with respect to each other.

5. The isolated full-bridge converter according to claim 3, wherein the isolated full-bridge converter is further configured to operate in a second operation mode to provide a full bridge operation, and in the second operation mode:
    the first transistor is switched on twice per switching cycle to be in a conducting state and is switched off twice per switching cycle to be in a non-conducting state, wherein the first transistor is once switched on and then switched off during the first interval and is once switched on and then switched off during the third interval,
    the third transistor is switched on twice per switching cycle to be in a conducting state and is switched off twice per switching cycle to be in a non-conducting state, wherein the third transistor is once switched on and then switched off during the second interval and is once switched on and then switched off during the fourth interval,
    the second transistor is switched on twice per switching cycle to be in a conducting state and is switched off twice per switching cycle to be in a non-conducting state, wherein the second transistor is once switched on and then switched off during the second interval and is once switched on and then switched off during the fourth interval, and
    the fourth transistor is switched on twice per switching cycle to be in a conducting state and is switched off twice per switching cycle to be in a non-conducting state, wherein the fourth transistor is once switched on and then switched off during the first interval and is once switched on and then switched off during the third interval, wherein the first transistor, the second transistor, the third transistor and the fourth transistor are all controlled to be pulsed with a duty cycle having a third duration of DT/2, wherein D is a variable parameter.

6. The isolated full-bridge converter according to claim 5, wherein the isolated full-bridge converter is further configured to operate in a first transition mode, which is applied when switching between the first operation mode and the second operation mode, wherein the switching durations of the first to fourth transistor in the first transition mode are:
morphed from the switching durations of the second operation mode to the switching durations of the first operation mode over multiple switching cycles when switching from the second operation mode to the first operation mode, or
morphed from the switching durations of the first operation mode to the switching durations of the second operation mode over multiple switching cycles when switching from the first operation mode to the second operation mode.

7. The isolated full-bridge converter according to claim 6, wherein when switching from the second operation mode to the first operation mode:
the time interval for which the first transistor is switched to be in the conducting state in the first interval in the second operation mode is increasing over subsequent switching cycles in the first transition mode by switching the first transistor to the non-conducting state at a later point of time in each switching cycle,
the time interval for which the first transistor is switched to be in the conducting state in the third interval in the second operation mode is increasing over subsequent switching cycles in the first transition mode by switching the first transistor to the conducting state at an earlier point of time in each switching cycle, and
the time interval for which the third transistor is switched to be in the conducting state in the second interval in the second operation mode is decreasing over subsequent switching cycles in the first transition mode; or
when switching from the first operation mode to the second operation mode:
the time interval for which the first transistor is switched to be in the conducting state in the first interval, the second interval and the third interval in the first operation mode is split into two time intervals by switching the first transistor to the non-conducting state and switching the first transistor to the conducting state in the second interval, wherein the time between these two time intervals is increasing over subsequent switching cycles in the first transition mode, and
the third transistor is switched to the conducting state between the two time intervals, wherein the time that the third transistor is switched to the conducting state is increasing over subsequent switching cycles.

8. The isolated full-bridge converter according to claim 6, wherein when switching from the second operation mode to the first operation mode:
the time interval for which the fourth transistor is switched to be in the conducting state in the third interval in the second operation mode is increasing over subsequent switching cycles in the first transition mode by switching the fourth transistor to the non-conducting state at a later point of time in each switching cycle,
the time interval for which the fourth transistor is switched to be in the conducting state in the first interval in the second operation mode is increasing over subsequent switching cycles in the first transition mode by switching the fourth transistor to the conducting state at an earlier point of time in each switching cycle, and
the time interval for which the second transistor is switched to be in the conducting state in the fourth interval in the second operation mode is decreasing over subsequent switching cycles in the first transition mode; or
when switching from the first operation mode to the second operation mode:
the time interval for which the fourth transistor is switched to be in the conducting state in the third interval, the fourth interval and the first interval of the following switching cycle in the first operation mode is split into two time intervals by switching the fourth transistor to the non-conducting state and to the conducting state in the fourth interval, wherein the time between these two time intervals is increasing over subsequent switching cycles in the first transition mode, and
the second transistor is switched to the conducting state between the two time intervals, wherein the time that the second transistor is switched to the conducting state is increasing over subsequent switching cycles.

9. The isolated full-bridge converter according to claim 1, wherein the isolated full-bridge converter comprises a blocking capacitor that is connected to an output port of the first leg or an output port of the second leg.

10. The isolated full-bridge converter according to claim 1, comprising a clamping circuit, which is configured to clamp a voltage on the primary winding of the transformer to a defined clamping threshold.

11. The isolated full-bridge converter according to claim 10, wherein the clamping circuit comprises two diodes, which are connected in one current path that is connecting the input ports of the primary winding, wherein same poles of the diodes are connected to each other.

12. The isolated full-bridge converter according to claim 10, wherein the transformer comprises a clamping winding on the primary side, wherein the clamping winding is a part of the clamping circuit, wherein the clamping winding is coupled to the first input port of the isolated full-bridge converter and the second input port of the isolated full-bridge converter via a clamping diode.

13. The isolated full-bridge converter according to claim 5, wherein the isolated full-bridge converter is configured to operate in a third operation mode in which:
the first transistor is switched on twice per switching cycle to be in a conducting state and is switched off twice per switching cycle to be in a non-conducting state, wherein the first transistor is once switched on and then switched off during the first interval and is once switched on and then switched off during the third interval,
the third transistor is switched on twice per switching cycle to be in a conducting state and is switched off twice per switching cycle to be in a non-conducting state, wherein the third transistor is once switched on and then switched off during the second interval and is once switched on and then switched off during the fourth interval,
one of the second transistor and the fourth transistor is in a conducting state during the entire switching cycle, and
the other one of the second transistor and the fourth transistor is in a non-conducting state during the entire switching cycle, wherein the first transistor and the second transistor are all controlled to be pulsed with a duty cycle having a fourth duration of DT/2, wherein D is a variable parameter.

14. The isolated full-bridge converter according to claim 13, wherein the isolated full-bridge converter is further configured to operate in a second transition mode, which is applied when switching between the second operation mode and the third operation mode, and wherein the switching durations of the first to fourth transistor in the first transition mode are:
   morphed from the switching durations of the second operation mode to the switching durations of the third operation mode over multiple switching cycles when switching from the second operation mode to the third operation mode, wherein a duration in which the one of the second transistor and the fourth transistor is in the conducting state is increasing slower within a first portion of the second transition mode than in a following second portion of the second transition mode, or
   morphed from the switching durations of the third operation mode to the switching durations of the second operation mode over multiple switching cycles when switching from the third operation mode to the second operation mode, wherein a duration in which the one of the second transistor and the fourth transistor is in the conducting state is increasing faster within a first portion of the second transition mode than in a following second portion of the second transition mode.

15. The isolated full-bridge converter according to claim 1, wherein the isolated full-bridge converter further comprises a snubber circuit that is connected to the secondary winding of the transformer.

16. Method for driving an isolated full-bridge converter that comprises a primary side, a secondary side comprising a rectifier, and a transformer comprising a primary winding that is coupled to the primary side and a secondary winding that is coupled to the secondary side, the method comprising:
   providing an inverter to the primary side of the isolated full-bridge converter, the inverter comprising a full bridge which comprises a first leg and a second leg, the first leg comprising a first transistor and a third transistor, and the second leg comprising a second transistor and a fourth transistor, wherein the first transistor and the second transistor are connected to a first input port of the isolated full-bridge converter and the third transistor and the fourth transistor are connected to a second input port of the isolated full-bridge converter, and
   selectively driving the isolated full-bridge converter in one of at least two different operation modes;
   wherein the at least two different operation modes comprise a number of subsequent switching cycles, each of the switching cycles is of a duration of 2T and comprises a first interval, a second interval, a third interval and a fourth interval, which are subsequent intervals in a given order, and the time duration of each of the intervals is equal to a duration of T/2, and wherein selectively driving the isolated full-bridge converter in one of at least two different operation modes further comprises:
   switching on and off the first transistor, the second transistor, the third transistor and the forth transistor in different orders and by different times in the at least two different operation modes respectively, and
   configuring different duty cycles of the first transistor, the second transistor, the third transistor and the forth transistor in the at least two different operation modes respectively.

17. The method according to claim 16, wherein the selectively driving the isolated full-bridge converter in one of at least two different operation modes further comprises operating the isolated full-bridge converter in a first operation mode in which:
   the first transistor is switched on once per switching cycle to be in a conducting state and is switched off once per switching cycle to be in a non-conducting state, wherein the first transistor is switched on during the first interval and is switched off during the third interval of each switching cycle,
   the third transistor is switched on once per switching cycle to be in a conducting state and is switched off once per switching cycle to be in a non-conducting state, wherein the third transistor is switched on during the fourth interval and is switched off during the fourth interval of each switching cycle,
   the second transistor is switched on once per switching cycle to be in a conducting state and is switched off once per switching cycle to be in a non-conducting state, wherein the second transistor is switched on during the second interval and is switched off during the second interval of each switching cycle,
   the fourth transistor is switched on once per switching cycle to be in a conducting state and is switched off once per switching cycle to be in a non-conducting state, wherein the fourth transistor is switched on during the third interval of each switching cycle and is switched off during the first interval, of a following switching cycle,
   wherein the first transistor and the fourth transistor are pulsed with a duty cycle having a first duration of (2+D)*T/2, and
   wherein the third transistor and the second transistor are pulsed with a duty cycle having a second duration of DT/2, wherein D is a variable parameter.

18. The method according to claim 16, wherein the selectively driving the isolated full-bridge converter in one of at least two different operation modes further comprises operating the isolated full-bridge converter in a second operation mode in which:
   the first transistor is switched on twice per switching cycle to be in a conducting state and is switched off twice per switching cycle to be in a non-conducting state, wherein the first transistor is once switched on and then switched off during the first interval and is once switched on and then switched off during the third interval,
   the third transistor is switched on twice per switching cycle to be in a conducting state and is switched off twice per switching cycle to be in a non-conducting state, wherein the third transistor is once switched on and then switched off during the second interval and is once switched on and then switched off during the fourth interval,
   the second transistor is switched on twice per switching cycle to be in a conducting state and is switched off twice per switching cycle to be in a non-conducting state, wherein the second transistor is once switched on and then switched off during the second interval and is once switched on and then switched off during the fourth interval, and the fourth transistor is switched on twice per switching cycle to be in a conducting state and is switched off twice per switching cycle to be in a non-conducting state, wherein the fourth transistor is once switched on and then switched off during the first interval and is once switched on and then switched off during the third interval, wherein the first transistor, the second transistor, the third transistor and the fourth transistor are all controlled to be pulsed with a duty cycle having a third duration of $DT/2$, wherein D is a variable parameter.

\* \* \* \* \*